United States Patent [19]

Edgar

[11] Patent Number: 5,572,608
[45] Date of Patent: Nov. 5, 1996

[54] SINC FILTER IN LINEAR LUMEN SPACE FOR SCANNER

[75] Inventor: Albert D. Edgar, Austin, Tex.

[73] Assignee: International Business Machines Corporation, Armonk, N.Y.

[21] Appl. No.: 295,317

[22] Filed: Aug. 24, 1994

[51] Int. Cl.⁶ .................................................. G06K 9/20
[52] U.S. Cl. .................................................. 382/321
[58] Field of Search .................................. 382/268, 269, 382/260, 279, 298, 299, 300; 348/581, 597, 61; 358/474, 488; 367/45; 360/45; 359/189; 364/413.13, 724.1; 324/142

[56] References Cited

U.S. PATENT DOCUMENTS

| | | | |
|---|---|---|---|
| 3,701,091 | 10/1972 | Lenihan | 367/45 |
| 3,775,759 | 11/1973 | Armitage, Jr. et al. | 360/45 |
| 4,991,092 | 2/1991 | Greensite | 364/413.13 |
| 5,023,951 | 6/1991 | Kahn | 359/189 |
| 5,073,858 | 12/1991 | Mills | 364/413.13 |
| 5,084,675 | 6/1992 | Reinfelder et al. | 324/309 |
| 5,212,659 | 5/1993 | Scott et al. | 364/724.1 |
| 5,222,500 | 6/1993 | Sugimoto | 128/653.2 |
| 5,268,575 | 12/1993 | Tajima | 250/330 |
| 5,331,414 | 7/1994 | Golin | 348/390 |
| 5,457,456 | 10/1995 | Norsworthy | 341/61 |
| 5,485,393 | 1/1996 | Bradford | 324/142 |
| 5,489,903 | 2/1996 | Wilson et al. | 324/142 |

OTHER PUBLICATIONS

Ward, J. Cok, D. R. "Resampling Algorithms for Image Resizing and Rotation", vol. 1075, p. 260–269, Jan., 1989.
Young, I. T., Verbeek, P. W.; Netten, H., "Exact Reconstruction of Sampled Images", IEEE, 242 Pages. p. 212, Sep. 1989.

Primary Examiner—Jose L. Couso
Attorney, Agent, or Firm—Jeffrey S. LaBaw

[57] ABSTRACT

A scanner which converts an oversampled substrate image into a digital pixel array which may be at an arbitrary sampling frequency lower than the first sampling frequency. The scanner sensor converts the substrate image into an array of analog pixel at a first sampling frequency. Preferably the first sampling frequency substantially oversamples the image from the actual frequency desired in the final digital image. The analog pixels are converted into a first array of digital pixels. The first digital pixel array is converted by a sinc filter in the linear lumen domain, i.e. the digital pixels are linearly representative of the brightness of light sensed by the sensor, to a second array of pixels at a second sampling frequency. The second sampling frequency should be much lower than the first sampling frequency to produce high quality images with substantially fewer pixels than required by the prior art.

17 Claims, 30 Drawing Sheets

GRID APPEARANCE AT STAGES OF PROCESSING frequency response at array resolution frequency response at buffer resolution frequency response at chosen output resolution

SINC FILTER IN LINEAR LUMEN SPACE FOR SCANNER

BACKGROUND OF THE INVENTION

This invention is related to commonly assigned patent applications, Reference Track Rectilinear Correction, Ser. No. 08/295,319 and Scanline Queuing For High Performance Image Correction, Ser. No. 08/295,318 both filed Aug. 24, 1994.

BACKGROUND OF THE INVENTION

This invention relates generally to processing digitally stored images. More specifically, it relates to processing image data retrieved from a low precision image scanner to a normalized high quality digital image.

In photographic arts, as computer technology became widely available, it became possible to electronically scan the film image to a stored digitized electronic image in a computer system. Once the images are digitized, they may be archived, edited, enhanced or otherwise processed digitally.

High resolution scanners use an array of sensors arranged in a line which is mechanically moved across an image. The eye can detect jitter of less than a quarter pixel requiring, with a two thousand element array on a 35 mm film, mechanical accuracy closer than five wavelengths of light. To achieve this accuracy, current state-of-the-art scanners rely upon high precision registration and handling of the substrate, e.g., film, on which the image is placed past the scanning optics. Quite naturally, the precision hardware is also quite expensive. Nonetheless, high quality image data is retrieved and digitized.

It is desirable to produce a low-cost scanner available for personal use in business, home, and school. One obvious way to make a personal scanner less expensive is to replace the expensive image handling hardware with less expensive low precision hardware. However, low precision hardware will result in scanned images with inconsistent vertical and horizontal spacing as the motor which is used to move the image substrate past the scanner, slows down, speeds up or possibly even reverses in direction. Other errors can be induced from the shifts of the substrate within tile hardware. Thus, in a scanner of this type, it will be necessary to provide a number of modifications and corrections to reduce the raw data to a normalized form consistent with a high quality image.

The present invention provides a filter queuing scheme to allow the corrections and adjustments to be made on oversampled raw scan data to reduce it to a corrected and normalized form.

SUMMARY OF THE INVENTION

Therefore, it is an object of the invention to correct for geometric distortions in a scanned image.

It is another object of the invention is to allow the use of relatively inexpensive substrate handling mechanisms for scanning images.

It is another object of the invention to compensate for jitter in the scanning and handling mechanisms.

These and other objects are accomplished by a scanner which converts an oversampled substrate image into a digital pixel array which may be at an arbitrary sampling frequency lower than the first sampling frequency. The scanner sensor converts the substrate image into an array of analog pixels at a first sampling frequency. Preferably, the first sampling frequency substantially oversamples the image from the actual frequency desired in the final digital image. The analog pixels are converted into a first array of digital pixels. The first digital pixel array is converted by a sinc filter in the linear lumen domain, i.e. the digital pixels are linearly representative of the brightness of light sensed by the sensor, to a second array of pixels at a second sampling frequency. The second sampling frequency should be much lower than the first sampling frequency to produce high quality images with substantially fewer pixels than required by the prior art.

This specification contains many details to implement a new type of scanner which is fundamentally different from current art. So the reader is not lost in the profusion of details, it will help to keep the following "nontechnical" explanation in mind.

If the reader were to bend this page, lay it sideways and view it from the side, the image reaching the eyes would be badly distorted. The human eyes would add many more distortions while imaging it from two angles through a "fisheye" lens on to a retina which is not flat. The retina loses all sense of rectilinearity as it "scans" in an hexagonal grid that varies in resolution across the field by orders of magnitude. In the brain, even sense of dimensionality is lost as the two-dimensional image is processed in three-dimensional space.

Despite these extreme distortions, the reader viewing the crumpled page can easily tell if one line is out of square by a fraction of a millimeter. One of Murphy's supposed laws is that the eye of the head draftsman is more accurate than the finest instrument. The eye itself is probably less accurate than the artist's instrument. It is the processing after the eye which imparts the accuracy. All other scanners try to perfect the mechanism, flatten the paper, view it squarely, reduce distortion in the lens and put the sensors on a perfect square. This scanner is fundamentally different. It seeks to build a "brain", i.e. processor, to perfect an irregular image after physical capture. The result will be a fundamentally new generation of scanners that are more flexible, more accurate and less expensive.

BRIEF DESCRIPTION OF THE DRAWINGS

These and other objects, features and advantages will be more easily understood in connection with the attached drawings and following description.

DETAILED DESCRIPTION OF THE PREFERRED EMBODIMENT

Figure 1:
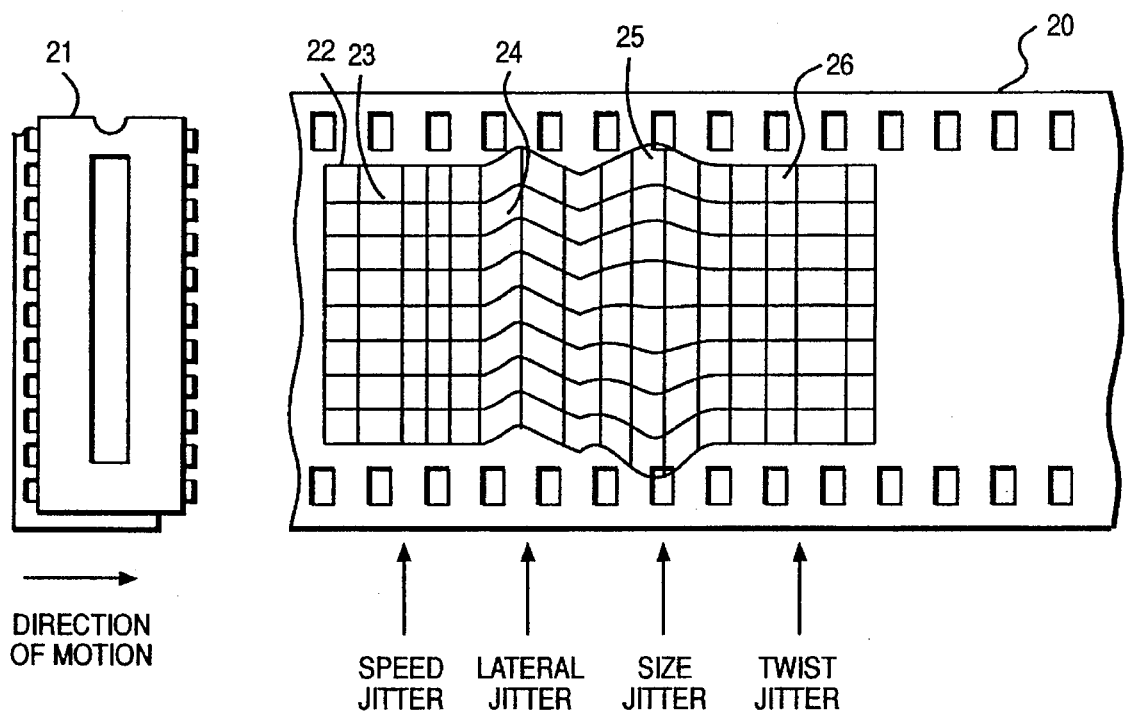
FIG. 1 illustrates the common types of mechanically induced errors which can occur in scanned image using a linear array.

Referring to FIG. 1, a film, 20 or other substrate on which the image is disposed is moved with respect to linear sensor array 21 to scan the image stored therein. The scanned image received by this linear array has a number of errors induced by deficiencies in the transport system. These errors are illustrated by an imaginary grid pattern 22, superimposed over the film 20. For ease of illustration, the film 20 itself is not depicted with those same errors, the errors represent how the array pixels would map back to the fixed film, as though the array were writing the grid pattern onto the fixed film. As the individual sensors are fixed in the silicon of the sensor array 21, some classical distortions are impossible. The distortions which are possible include a varying horizontal magnification 23 caused by speed jitter, a vertical waviness 24 caused by the lateral jitter of the sensor or the film. A complementary vertical waviness 25 is caused by optical magnification variations due to change of focus of the imaging lens or movement of the film toward and away from the imaging lens during a scan, and is called size jitter. Finally, the slanting 26 of vertical lines is caused by a twisting of the array. This twist jitter 26 is not a particularly significant problem in the experience of the applicants.

Figure 2A:
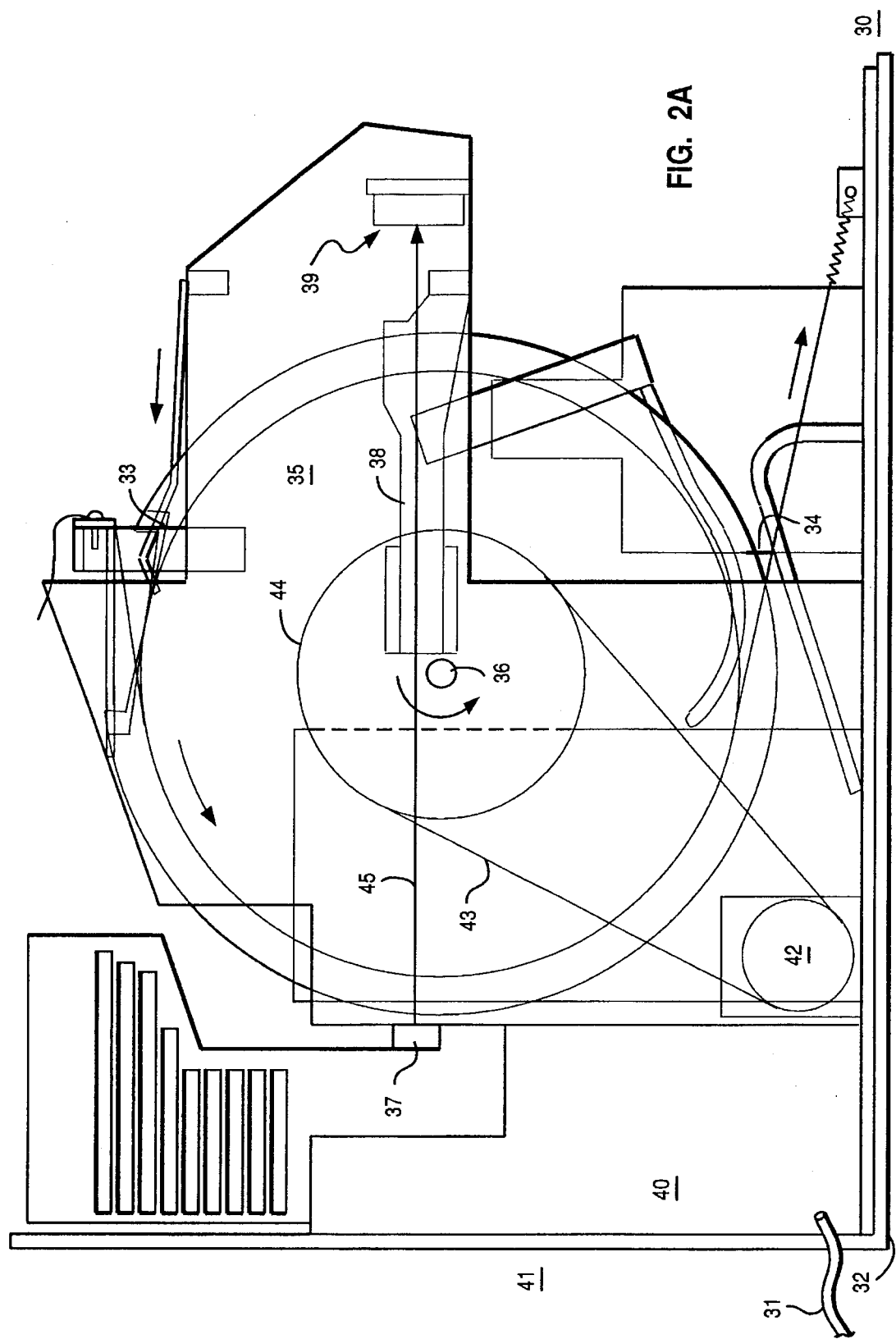
FIG. 2A is a diagram of the scanner coupled to a computer system.
Figure 2B:
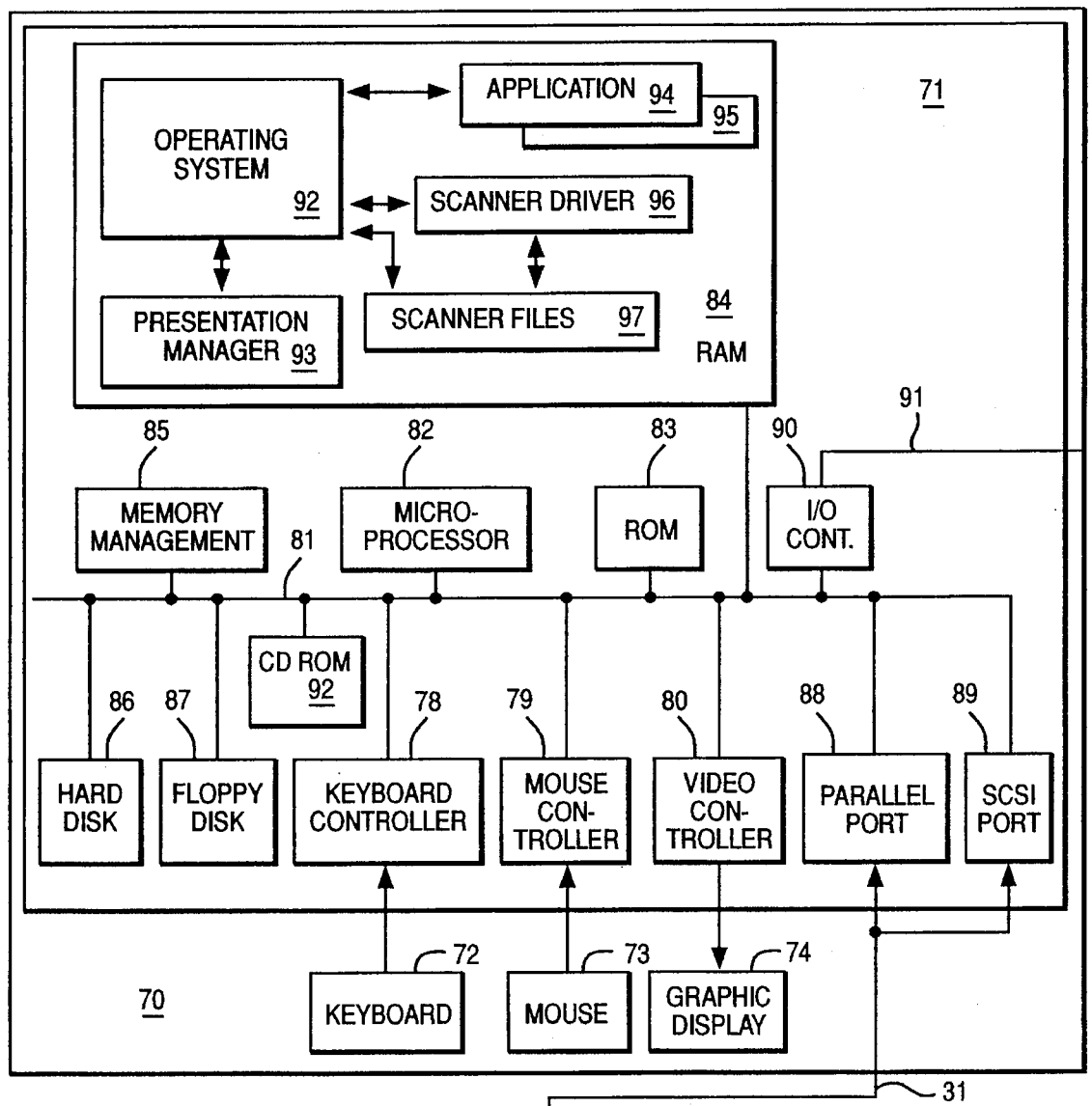
FIG. 2B is a block diagram of the computer coupled to the scanner.

As shown in FIG. 2A, a scanner 30 is coupled to a personal computer 70, shown in block diagram form in FIG. 2B, by means of a cable 31. A protective housing 32 is provided in which the various electrical, mechanical and optical systems are contained. A strip of film (not pictured) is introduced into the entry aperture 33 and exits from the exit path aperture 34 in the direction of the arrows. After the film strip is urged sufficiently into the entry aperture 33, the drum assembly 35 will grasp the film strip drawing it within the housing 32. The drum assembly 35 rotates around the shaft 36 in the direction of the arrows. As the film strips rotates with the drum assembly 35, the film strip will eventually traverse the semicircular path around the shaft 36.

On the inner surface of the right and left portions of the drum 35, two reference tracks (not pictured) will be imprinted which serve as timing tracks or position locators during the scanning process. These will be discussed in much greater detail below in connection with FIGS. 9–10.

The light source 37, lens assembly 38, transducer scanner assembly 39, and power supply 40 are among the components of the scanner which are controlled by the electronic circuitry 41. The rotational translation of the drum 35 about the axle 36 is accomplished by an electronic motor 42 and drive belt 43 disposed around drum drive wheel 44. After the film is translated to a position opposite light source 37, the image is read along optical path 45 to lens assembly 38 which focuses the image on the transducer/scanner assembly 39. The scanner assembly 39 preferably comprises a CCD linear array such as part number TCD 1300b which is available from Toshiba. The reference tracks imprinted on the inner surfaces of the right and left film support shoulders of the drum are also simultaneously scanned by the scanner assembly 39.

Referring to FIG. 2B, the scanner 30 is shown coupled to the computer 70 by means of cable 31 in block diagram architectural form. Items such as a connection to a suitable source of electronic power such as a 110 volt AC line, power switch with appropriate fusing and the power supply for the computer and scanner are not depicted for sake of clarity. The scanner is coupled to the computer by means of I/O interface 47. In the preferred embodiment, a digital signal processor 48 is required for controlling the operation of the various components and for storing the scanning data derived from the operation of the scanner in RAM 49. The components of the scanner are controlled by the computer in alternative embodiments. Address data and control lines extend through the cable 31 to the personal computer 70. The DSP 48 and load storage 49 together provide the appropriate address and command functions to the other components of the scanner.

The DSP 48 may control the color and intensity of lamp 37 shining through the film, the speed and direction of the motor 42 and the scanning of the CCD array 39 through the scan control 50. It is possible to have a separate block of hardware to provide the scan control, but having the control code in RAM is much more desirable as it allows the code to be changed without hardware modifications. Storing the control code in RAM does require that the code to run the DSP be downloaded from the host. A small program to communicate with the host computer must be in ROM within the scanner to initialize the system. In the alternative, when external image processing and control of the scanner is desired, a scanner can be obviously controlled and its data downloaded to the external computer system depicted in FIG. 2B. The cable may be linked to the scanner as a conventional parallel port connector or other means known to the art.

Among the various modules in the scanner RAM 49, are scan control module 51, the impulse responses 52 for the scaling process, as well as control data 53 detailing the scan parameters such as the boundaries of the area of interest on the film. These modules are kept in permanent storage in the computer and downloaded to the scanner. Also in RAM, are plurality of buffers 55–64 which are used to store the image during the various stages of processing. Raw scan buffer 55 stores the scan lines as they are received from the CCD 39. Lengthwise prescale buffers 56, 57 and 58 store the intermediate values of three prescaled scan lines. Dark correction buffer 59 and light correction buffer 60 store pixel values which are used to normalize the prescaled scan lines. Line register 61 is used to store the normalized, prescaled scan lines for the positioning and tracking processes. The crosswise buffer 62 stores the crosswise scaled scan lines. The lengthwise buffer 63 queues the crosswise scaled scan lines for the lengthwise scale process. Finally, the output buffer 64 stores the corrected image for further image processing. This image processing would most likely be accomplished by the personal computer 70 with specialized image software.

The scanner 30 may be attached to a variety of computers or collection of computers under a number of different operating systems. The computer could be, for example, a personal computer, a mink computer, mainframe computer or a computer running in a distributed network of other computers. Computers in the IBM PS/2™ series of computers could be used in the present invention. For additional information on IBM's PS/2 series of computers, the reader is referred to *Technical Reference Manual Personal Systems/2* Model 50, 60 Systems IBM Corporation, Part No. 68X2224 Order Number S68X-2224 and *Technical Reference Manual Personal Systems/2* (Model 80) IBM Corporation Part No. 68X 2256 Order Number S68X-2254.

In FIG. 2B, a computer 70, comprising a system unit 71, a keyboard 72, a mouse 73 and a display 74 are depicted. The system unit 71 includes a system bus or plurality of system buses 81 to which various components are coupled and by which communication between the various components is accomplished. The microprocessor 82 is connected to the system bus 81 and is supported by read only memory (ROM) 83 and random access memory (RAM) 84 also connected to system bus 81. The ROM 83 contains among other code the Basic Input-Output system (BIOS) which controls basic hardware operations such as the interaction and the disk drives and the keyboard. The RAM 84 is the main memory into which the operating system and application programs are loaded. The memory management chip 85 is connected to the system bus 21 and controls direct memory access operations including, passing data between the RAM 84 and hard disk drive 86 and floppy disk drive 87. A read-write CD ROM 92 also coupled to the system bus 81 is used to store a large amount of data, e.g., a plurality of scanned and digitized images.

Also connected to this system bus 71 are various I/O controllers: The keyboard controller 78, the mouse controller 79, and the video controller 80. As might be expected, the keyboard controller 78 provides the hardware interface for the keyboard 72, the mouse controller 79 provides the hardware interface for mouse 73, the video controller 80 is the hardware interface for the display 74. Rather than requiring a scanner controller card as the hardware interface for the scanner 30, requiring another slot in the computer, in the preferred embodiment, the control cable 31 can be attached to parallel port 88 or a SCSI drive port 89. Serial ports, etc. would also work, limited only by their capacity to keep up with the scanner output. Even when the scanner would like to send out data faster than the host is willing to receive it, the scanner just slows or stops the scanning process to accommodate the host. As will be discussed below, such slowing may be accommodated in the prescale without affecting the pixel clock of the source itself. Few if any other scanners are capable of showing or stopping the scanning process and since all popular PC operating systems are "non-real-time", this is an important advantage of the present invention. An I/O controller 90 such as a token ring adapter card can provide communications to other computers over a network 91. The computer may provide appropriate software which will enable the user to control the various components of the scanner.

Software in the computer RAM 84 can control the operation of the scanner. The operating system 92 controls the operation of the components of the computer system. Presentation manager 93, which may be incorporated in the operating system, manages the presentation of the user interface through which the user provides input to the system. Applications 94, 95, e.g., image editing applications such as Adobe Photoshop™, are presented in the user interface and can be utilized to manipulate the output of the scanner. The scanner may be controlled through a scanner driver 96 containing control information about the scanner.

For a more detailed description of one preferred embodiment of the scanner, please refer to commonly assigned application entitled "Film Scanning System and Method" to A. D. Edgar, Ser. No. 08/269,336 filed Jun. 30, 1994, which is hereby incorporated by reference.

Figure 3:
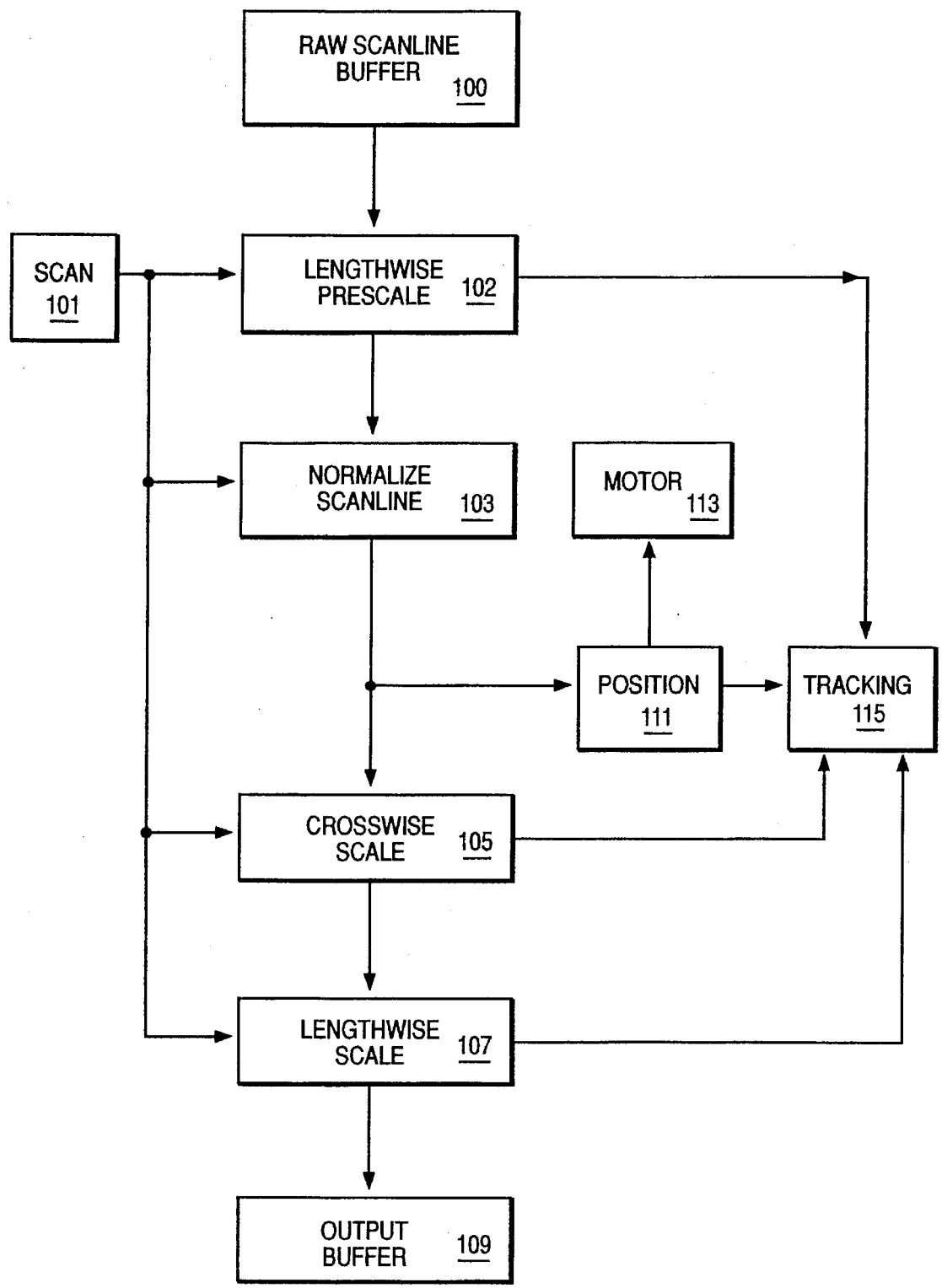
FIG. 3 is a flow diagram of the overall process for correcting the scanned image.

The general process followed by the microcode for correcting the scanned image is depicted in FIG. 3. Many of these blocks will be covered below in greater detail. Those skilled in the art would recognize that the calculations could be carried out by software at the personal computer rather than the scanner microcode at a significant sacrifice of speed. A significant component in this loss of speed is the need to accommodate the substantial increase in data that would have to be passed from the scanner to the host to allow the host to perform those functions.

In step 100, the raw data from the CCD array is stored as sensed in the raw scan line buffer. This data will include all of the distortions due to mechanical deficiencies in the handling of the film. The scan process 101 monitors the progress of the normalization of the scan lines and activates the other modules when scan lines are available for processing. This raw scan line data is processed in the lengthwise prescale step 102 which is discussed in greater detail with reference to FIG. 5 below. The lengthwise prescale process receives the raw scan lines at a resolution that varies with motor speed and outputs scan lines prescaled to an approximate buffer resolution. Next, in step 103, the scan lines are normalized. In any CCD sensor, certain of the sensor elements may have greater dark leakage or sensitivity than the average sensor element. The normalization process compensates for this nonuniformity by dividing by the number of raw scan lines averaged in the lengthwise prescale process, subtracting the dark correction and dividing by light correction (sensitivity) for that sensor element. The correction coefficients are stored in the dark and light correction buffers. The crosswise scale step 105 does a precision crosswise scaling from the array resolution to the chosen resolution of the output buffer. It is called by the scan module 101 when a scan line is available from the normalized scan line process 103. The lengthwise scale process 107 does precision lengthwise scaling with the scan lines queued from the crosswise scale 105. After the lengthwise scale process 107, the normalized image is stored in the output buffer 109 for further image processing.

While the position 111, motor 113, and tracking 115 modules could be placed elsewhere in the process, it has found to be most convenient to use the normalized scan line from step 103 to calculate the position of the scan line in the image. The entire normalization process is dependent on the accurate knowledge of the position of each scan line. The position module 111 calculates the position of the latest normalized scan line and passes this information to the motor 113 and tracking 115 modules. The motor module 113 is used to control the speed at which the image is being scanned. If too many or too few scan lines are being scanned per time increment, the scan speed will be decreased or increased accordingly. Tracking 115 is called by the scaling steps 102, 105, 107 to convert the raw scan lines to the normalized resolution. In the case of the lengthwise prescale 102, tracking 115 gives a guess about the position since the positions of the scan lines which they are currently processing have not been calculated yet.

In the preferred embodiment, which will be described in greater detail below in connection with FIGS. 9–11, the position of each scan line is calculated by referring to a reference grid disposed proximate to the substrate, e.g., a pair of reference tracks in the substrate holder which flank the image. The position module 111 refers to the portion of the scan lines which contain the reference tracks after they have been prescaled by step 102 to reduce the number of lines and reduce the random noise in the array through averaging, and normalized by step 103 to remove fixed pattern noise from the sensor. After establishing the position of the prescaled, normalized scan line, the motor block 113 receives the newly calculated position data as an indication of transport speed by comparing the new data to previously received data. The motor block uses this speed measurement to control the motor to keep a consistent scan speed. The position data is also passed to the tracking block 115. Based on tables of current and past positions with each scan line, the tracking block 115 makes best estimates of positions at various times in the past and future as called on by the different scaling blocks 102, 105, and 107. Even the positions:passed to blocks 105 and 107, after measuring position in block 111, are preferably based on same low-pass filtering to reduce measurement noise, and hence may be called estimates.

Figure 4:
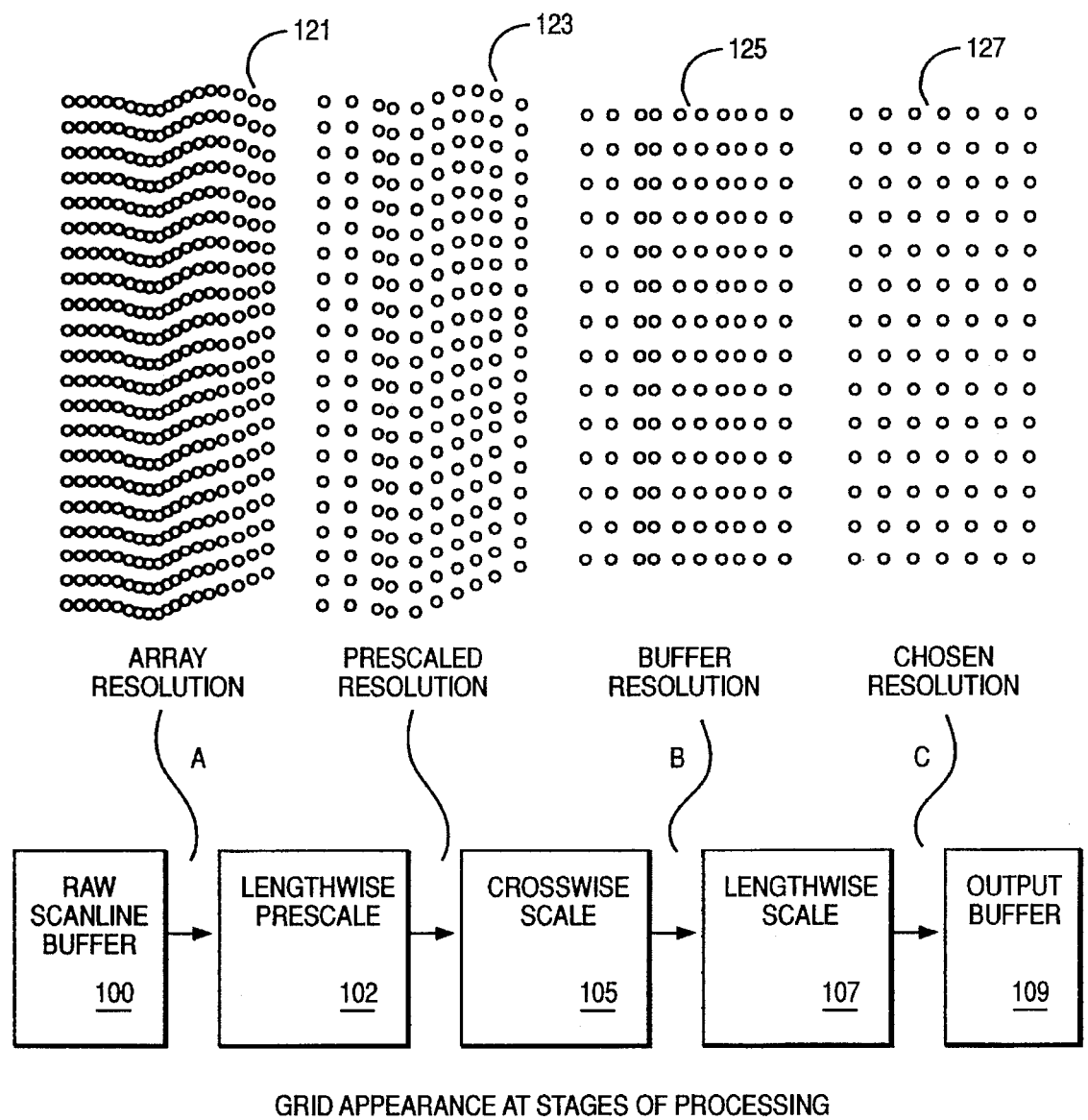
FIG. 4 depicts the grid appearance at various stages of processing the scanned image.

The appearance of the scanned image is depicted in FIG. 4 at the various stages of processing. The dots in each of the arrays 121, 123, 125 and 127, indicate representative pixel locations in the scanned image. The image stored in the raw scan line buffer is at the resolution of the CCD sensor array. As shown by the raw array 121, the pixels in the scanned image have all of the horizontal and vertical distortions caused by the various types of jitter discussed above and are positioned on an irregular grid. After the lengthwise prescale 102, as depicted by prescaled grid 123, much of the horizontal distortion between positions caused by speed jitter has been eliminated from the image. After the crosswise scale, the grid 125 has been corrected for vertical distortions due to lateral and size jitter and is stored at the buffer resolution and are queued in the lengthwise scale buffer for the lengthwise scale process buffer in the digital signal processor. After the lengthwise scale, the remaining horizontal distortions have been eliminated and the scanned and processed image is stored at the chosen grid positions defined by the user, application or scanner defaults. The processed image is stored in the output buffer 109 for further processing, e.g., by image editing applications at the computer. Examples of such editing applications include: Format conversions, color adjustments, sharpening, cropping, rotation, touch-up, and various artistic transformations.

While the term "resolution" has many possible meanings to those in the image field, in the discussion which follows, it is used to describe the spacing between pixels in the various image grids at various stages of processing.

Scaling one dimension at a time enables the use of wider windows. For example, a 10 pixel wide window requires for each image pixel two passes with 10 accumulates each, while a two dimensional resize with the same window size would require a single pass with 10 squared, or 100 accumulates for each pixel. In a convolution function, an "accumulate" count is a count of the number of times the computer needs to recall two numbers, multiply them, and add the result to an accumulator. By using the wider windows, a mathematically ideal sinc function can be better approximated. Also, during the scaling process, correction for resolution losses can be added with no additional computation time by modifying the sinc function, effectively convolving sinc function with the inverse of the system resolution response.

Figure 5A:
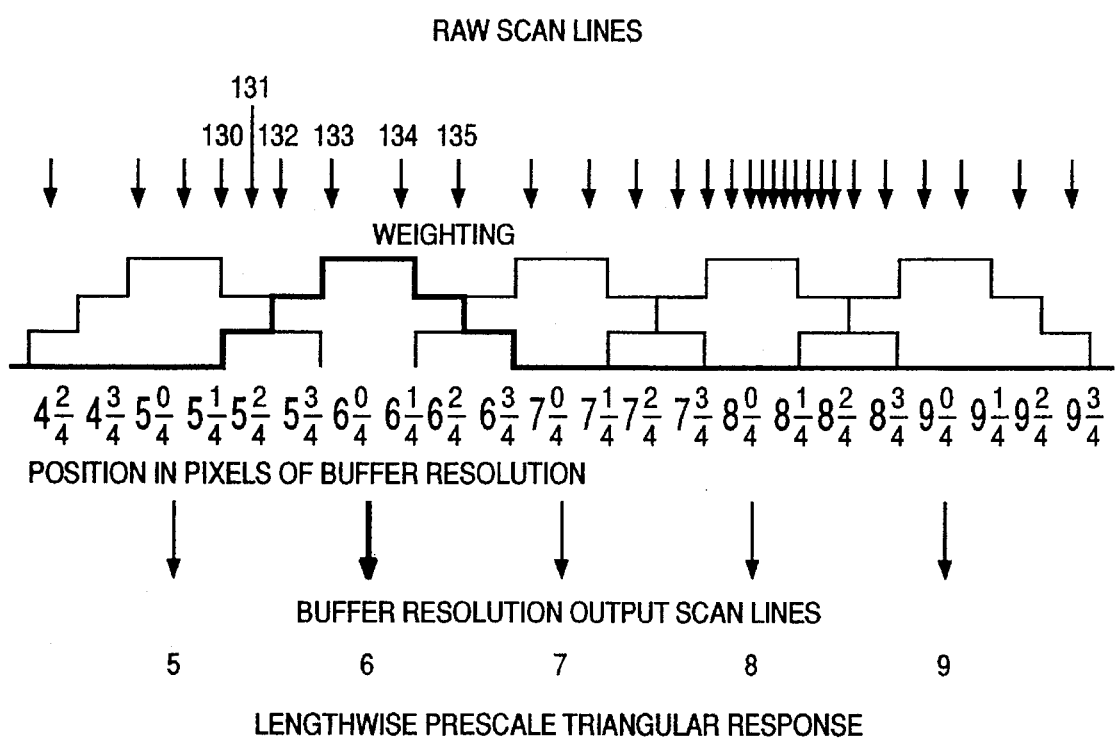
FIG. 5A depicts the triangular weighting of the lengthwise prescale process.

The conversion and weighting process of the scan lines in the raw scan line resolution to the prescaled resolution is depicted in FIG. 5A. As shown in the figure, several scan lines sensed by the array are averaged into a single prescaled scan line according to a triangular averaging function. For example, prescaled output line number 6, is an average of raw scan lines numbered 130–135. Raw scan lines 133 and 134 have their full value added as their position is between 6.00 and 6.25 pixels of prescale buffer resolution. Raw scan lines 132 and 135 have two thirds of their value added as they respectively occur between 5.75 and 6.00 pixels and between 6.25 and 6.50 pixels of the prescale buffer resolution. Raw scan lines 130 and 131 have one third of their value added as they occur between 5.25 and 5.50 pixels of prescale resolution. If there was a raw scan line between 6.50 and 6.75 pixels of prescale resolution, it would also be added at one-third of its value. Other averaging functions could be used. A precalculated sinc function is used in the following crosswise and lengthwise scale processes. As the raw scan lines come at unpredictable intervals, it is not possible to have a precalculated function, and the alternative of calculating a sinc function as the scan lines came in for filtering was judged too computationally expensive.

Figure 5B:
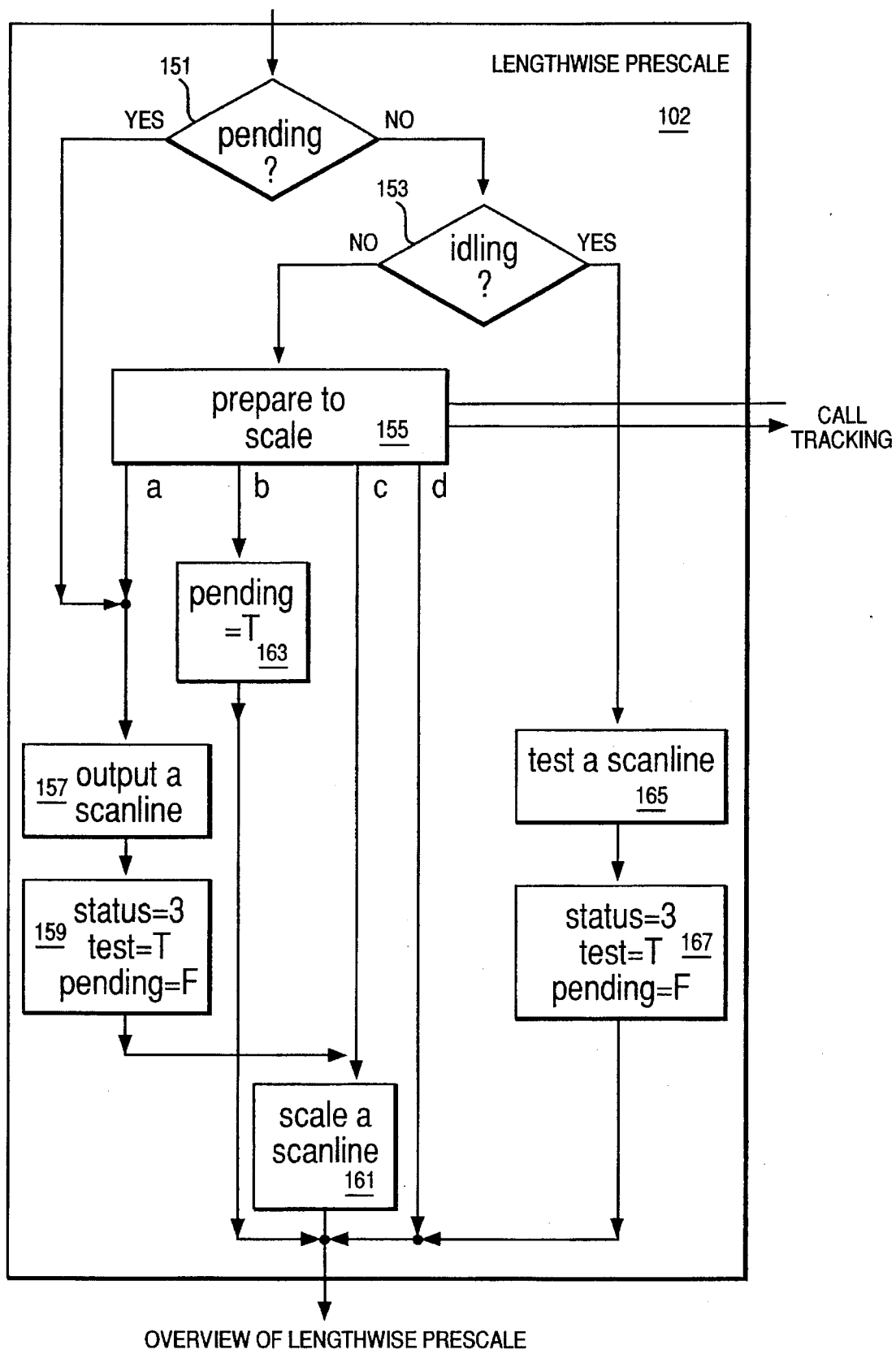
FIG. 5B is a flow diagram of the lengthwise prescale process.

The lengthwise prescale process is depicted in greater detail in FIG. 5B. After receiving a raw scan line from the raw scan line buffer, the pending module 151 uses two arrays to accumulate the raw scan lines into fewer lines at the lengthwise prescale buffer resolution a third array holds the output line at prescale buffer resolution. When a prescale buffer resolution line is ready for output, it is named "out".

In one preferred embodiment, there are three pointers, "new", "old" and "out" which identify which scan line is stored in which array. By using the pointers, the pending block 151 is able to switch pointers to use the previous output array as the new accumulator array, the previous accumulator array as the new old array and the previous old array as the new output array. Referring to FIG. 5A, the reader will note that as the new scan line buffer begins to accumulate scan lines, the old scan line buffer is still accumulating raw scan lines. Switching of the pointers cannot take place until the software has completed processing the previously output scan line or the output data would be lost. After outputting a buffer resolution scan line, several raw scan lines can be received and integrated while the system is processing the data. If the system gets behind, the lengthwise prescale software will stop before overwriting the old data and will return with pending flags. This is a warning to the scan software to finish processing the scan line. The pending module 151 concludes with a simple test, if pending is set, it will branch to the output code in step 157 and finish the job.

In the idling module 153, the system periodically tests the position of the scan line without waiting for the integration of the lengthwise prescale process and the scan line normalization process as shown in FIG. 3. It does this by, under the condition that no processing is pending, i.e. all pending flags are idle, outputting a raw scan line directly to the position detection algorithm. This is useful when the scan motor slows or stops. Under those conditions, the software predicts little or no motion and most of the processing waits, allowing time for this extra test. Without this, once stopped, the software would "predict" zero motion and would never notice when the motor restarted. Thereby, the tracking module 115 (FIG. 3), will always know the current position even if the motor, and therefore, the lengthwise prescale process have stopped. This testing is triggered when the DSP is finished all other tasks which occurs when the motor slows are stops.

In step 155, the prepare to scale module calls the tracking module with the scan time and receives the position back from tracking. The position will be in units of scan lines and a buffer resolution. The position will have an integer part and a two-bit fraction part. If the integer portion is less than a past integer portion of a scan line previously scanned, then the lengthwise prescale returns immediately along path "d" on the flow chart. This means that the motor has reversed and the lengthwise prescale process will wait patiently for a new scan line to restart. If the integer portion is greater than a past integer portion, then a process line is available for output. If the status parameter is equal to zero, a line can be output and the path "a" on a flow chart is taken to the output scan line module 157. Before taking path "a", the temporary out, new and old pointers to the three buffers are set as follows: Temporary out=previous old: new=previous out; old=previous new. If the integer portion is greater than a past integer portion but the status parameter does not equal zero, the integration can continue for a short time while the weighting factor of new is zero. Because the weighting factor is zero, a current scan line will not be added into the buffer pointed to by "new", giving a short time to complete processing on what was in that buffer. In this case, set delay=integer, temporary out=previous old, new=previous out and old=previous new. In this situation, a further test is performed to determine if the status parameter does not equal zero and also if position is two-quarters or more ahead of the delay parameter. If the condition is not met, then the processing cannot continue until the line is freed or the data will be overwritten. The code takes path "b" to set the pending flag to "true" in step 163, and leaves the raw scan line in the buffer. If none of the above has occurred, the code takes path "c" to scale the scan line in step 161. At any exit from the prepared to scale module, the past integer parameter is set to the current integer value.

In step 157, scan line is output to be scaled during this step, the out parameter is set to temporary out, new count and new time parameter are set to zero and each pixel in the new buffer is set to zero. In step 159, status is set to 3 a non zero number, e.g., test is set to false and pending is set to false because if it had been blocked with a pending scan line, the buffer is now cleared.

In step 161, the scan line is scaled. First, a test for pending overflow of the raw scan line buffer is made. If adding further to the buffer would cause an overflow condition, no further additions are made until the scan moves on to the next line. This would happen, for example, if the transport mechanism stops or moves extremely slowly to adjust for a host computer temporarily occupied with another task and unable to receive data. When a raw scan line is added to the buffer, a test is made to determine if there have been lost raw scan lines by checking the sequence number of the raw scan line. A scan line may be lost if the software was busy doing something else. If only one scan line was lost and processing can continue normally. If scan lines are lost repeatedly, the motor speed is reduced to give the processor a chance to catch up. If more than one scan line is lost, the processing may be suspended and the motor reversed slightly. The processing is restarted and the motor is restarted. Normal processing automatically picks up the correct position as read through the tracking code. If the old count or the new count is greater than a specified number for the size of the buffer, the scan line is not scaled to avoid overflowing the old or new arrays. If both the old count and new count are acceptable, depending on the fraction of the position, one of four things is done according to the value of the fraction as shown in the table below.

| Action | Fraction | | | |
|---|---|---|---|---|
|  | 0/4 | 1/4 | 2/4 | 3/4 |
| add to old count | 3 | 3 | 2 | 1 |
| add to new count | 0 | 0 | 1 | 2 |
| add to old time | 3 × scan time | 3 × scan time | 2 × scan time | 1 × scan time |
| add to new time | 0 | 0 | 1 × scan time | 2 × scan time |

The first two lines of the table are more easily understood by referring to the triangular averaging process shown to FIG. 5A. In this figure, the scans come in at regular time intervals. These scans, numbered according to time, lay at varying positions caused by speed variations.

In step 165, if the system is idling, in step 153, the current raw scan line is copied into the out buffer, the out count set to one and the out time is set to the current time. In step 167 status is set to 3, test is set to true and pending is set to false.

After the lengthwise prescale, the scan line is normalized by the normalized scan line process which takes out artifacts in the scan line due to nonuniformities in the CCD array. As mentioned previously, the sensor elements vary in dark leakage and sensitivity. By averaging several raw scan lines, random noise is reduced inversely as the square root of the number of raw scan lines averaged, as is well known. The prescaled scan line is divided by the number of raw scan lines accumulated for that prescaled scan line. To remove fixed pattern noise, in statistics theory, the dark correction buffer values are subtracted to correct for dark leakage and the result is divided by light correction values to correct for variations in sensitivity between sensor elements.

As mentioned previously, after the prescaled scan line has been normalized, it is sent to the position module to calculate the position of the scan line.

Figure 6A:
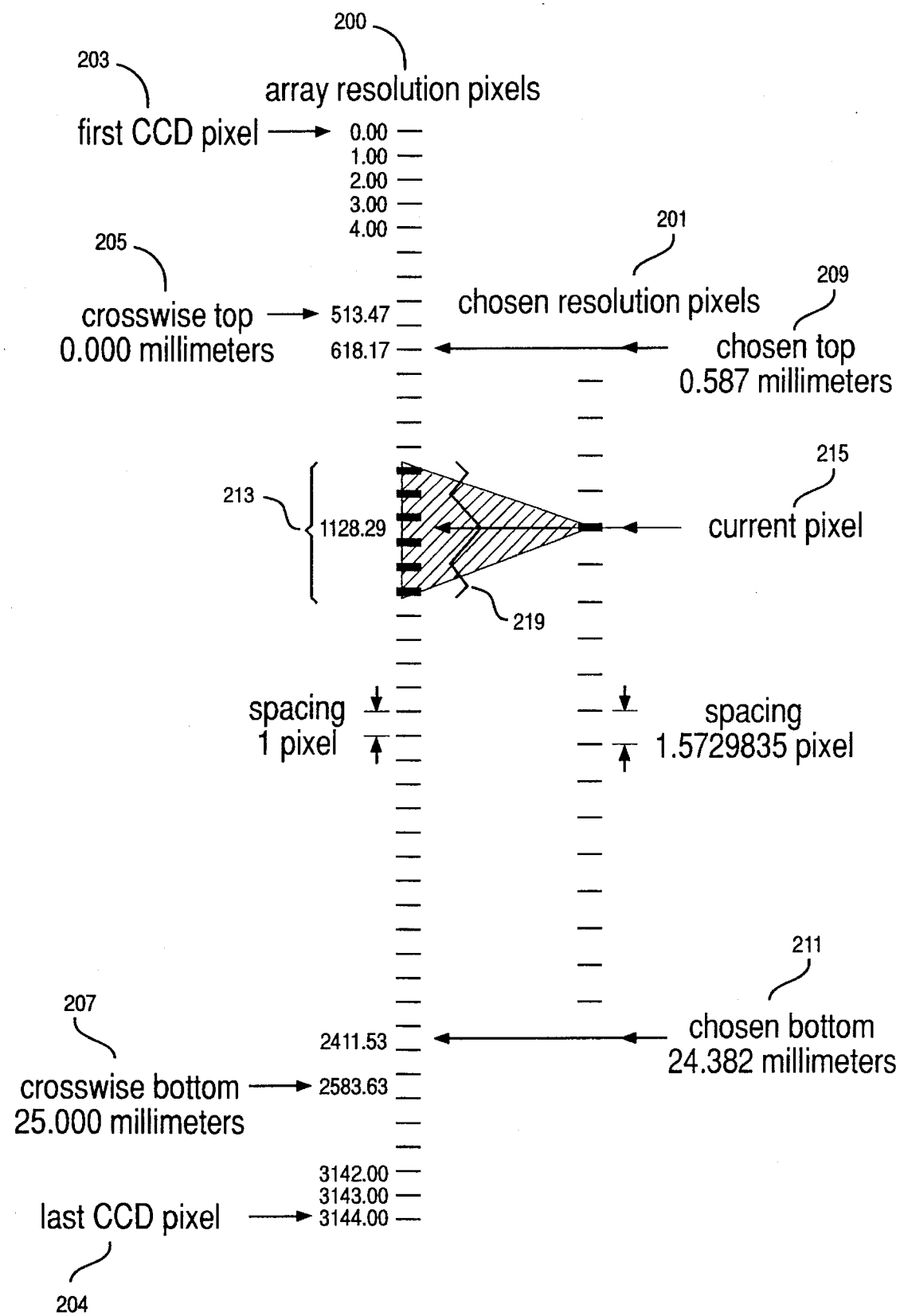
FIGS. 6A and 6B are diagrams of the translation of CCD array resolution pixels to the chosen resolution pixels in the crosswise scale process.

The crosswise scale module then receives the normalized scan line for the entire CCD array with pixels numbered in integer increments. It also receives from the tracking module positions of the top and bottom crosswise tracks in units of fractional CCD array pixels from which the film aperture can be calculated in units of array pixels. As can be noted in FIG. 6A, the normalized scan line is converted from the array resolution into the chosen resolution. In addition, any vertical jitter is removed from the scan line by referring to the positions received from tracking. The CCD array extends beyond the substrate as shown by the first CCD pixel 203 and the last CCD pixel 204, bounding the crosswise top pixel 205 and crosswise bottom pixel 207, which represent the top and bottom of the image substrate or film. In the preferred embodiment, the position of the scan line is calculated from the reference tracks are located outside either edge of the image. The chosen resolution array 201, has a chosen top 209 and a chosen bottom 211 pixel which are specified in millimeters or can be converted back into fractional array pixels. The number of chosen resolution pixels is used to calculate the chosen resolution spacing in units of array pixels. After these calculations are made in setup, the crosswise scale process uses a window of pixels from the normalized scan line to calculate particular current pixels 215 in the chosen resolution array.

Figure 6B:
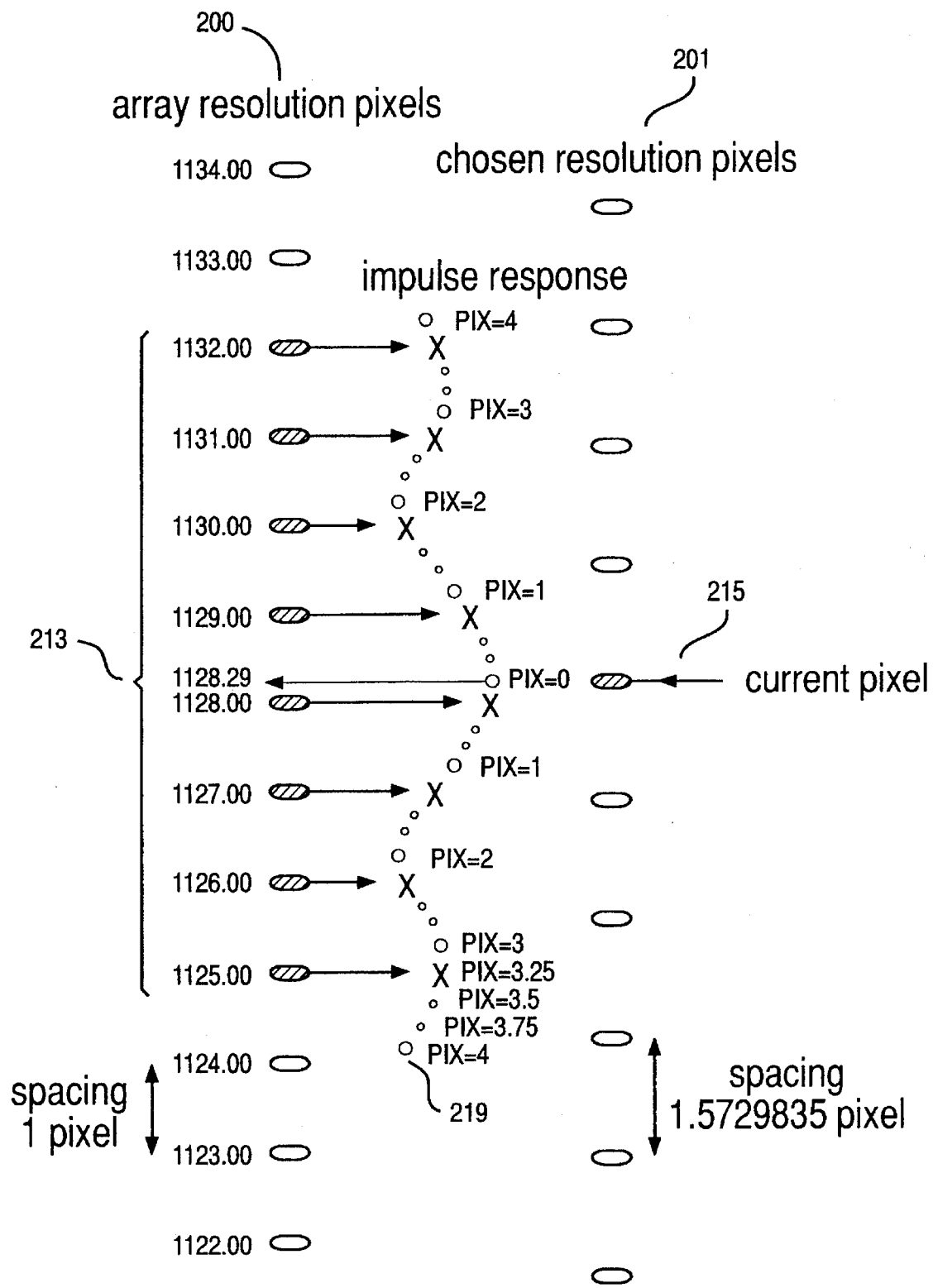

In FIG. 6B, a precalculated impulse response 219 is used to weight the calculation of the current pixel value at the chosen crosswise resolution. A precalculated sinc impulse can be used, since the spacing of the sensor elements is known in the CCD array. As will be discussed below, other functions can be used in the transformation process. The position of a current pixel 215 at the chosen resolution is calculated in units of the array resolution pixel, e.g., 1128.29 pixels, adding the spacing to the position of the previous pixel. The impulse response is centered on the current pixel and is offset relative to the closest array pixel by a fraction, 0.29 in this example. The impulse response 219 has fractional steps to accommodate this offset, e.g., the fractions are a quarter of an array pixel unit. The closest fractional step, i.e. one-quarter, is chosen and the impulse is aligned as closely as possible to the current pixel, while the fractional elements in the impulse align exactly with the array pixels. Each of the array pixels is multiplied by its overlaying impulse element, the products are summed and stored in the current chosen resolution pixel 215.

The crosswise array resolution is fixed by the physical spacing of sensing elements in the CCD. The focus of the lens will change the spacing only slightly, and may be considered a constraint for this application. Because the array resolution and chosen resolution remain effectively fixed for an entire scan, the intermediate offer resolution step is not needed. Because of this constancy, the point composing the impulse response can be calculated and stored before scanning starts, then retrieved from the memory look up table repeatedly as needed during the scan.

Figure 7:
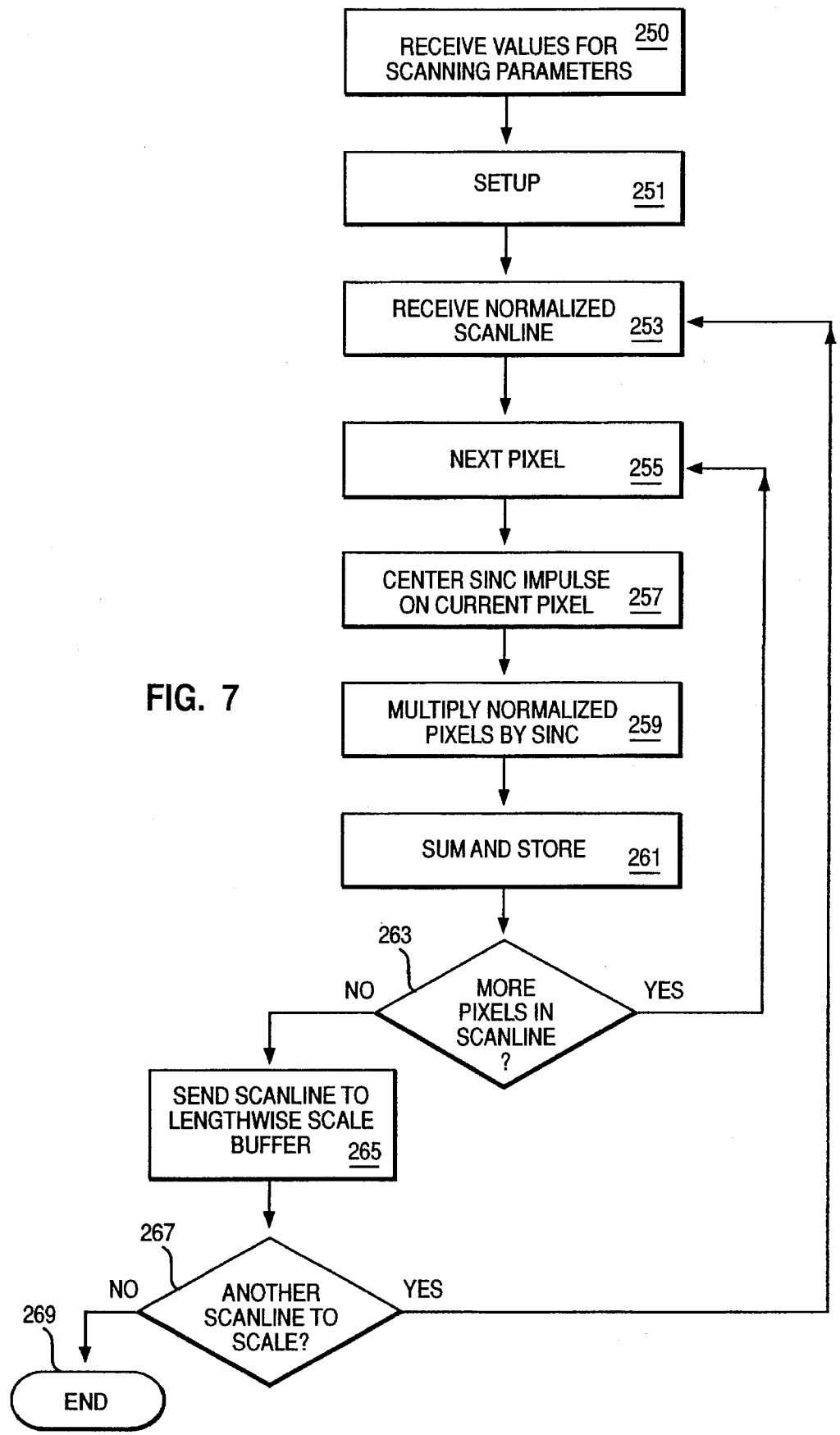
FIG. 7 is a flow diagram of the crosswise scale process.

The following procedure is one preferred embodiment for the crosswise scale process as shown in FIG. 7. The following variables are defined:
CRTT crosswise position of top track in pixels
CRBT crosswise position of bottom track in pixels
A fractional distance between tracks to top of aperture, typically 0.1
B fractional distance between tracks to bottom aperture, typically 0.9
C a variable with use similar to A
D a variable with use similar to B
CRTA crosswise position of top edge of aperture in pixels
CRBA crosswise position of bottom edge of aperture in pixels
CRTAM crosswise position of bottom edge of aperture in millimeters
CRBAM crosswise position of bottom edge of aperture in millimeters
CHTM chosen position of top in millimeters
CHBM chosen position of bottom millimeters
CHT chosen position of top in array pixels
CHB chosen position of bottom in array pixels
CHR chosen resolution in total crosswise pixel count
DY spacing of chosen resolution pixels in array resolution pixels Certain parameters are received in step 250.

CRTT and CRBT are received by calling Tracking. A, B, CRTAM, and CRBAM are constants for the film holder and are either entered by the user for a particular session or are established by a direct scan of the holder. CHTM, CHBM, and CHR are specified by the personal computer starting a scan. All of the parameters could have default values if none are specified by the user, scanner or personal computer.

These parameters are used to setup the crosswise scale process to produce a scan line which is both of the chosen length and the chosen resolution. As mentioned above, prior art scanners are not able to produce scanned images at such arbitrary resolutions and sizes. During the setup procedure, step 251, the following parameters are calculated:

$$CRTA = (1 - A)*CRTT + A*CRBT$$
$$CRBA = (1 - B)*CRTT + B*CRBT$$
$$C = (CHTM - CRTAM)/(CRTAM - CRBAM)$$
$$D = (CHBM - CRTAM)/CRTAM - CRBAM)$$
$$CHT = (1 - C)*CRTA + C*CRBA$$
$$CHB = (1 - D)*CRTA + D*CRBA$$
$$DY = (CHB - CHT)/(CHR - 1)$$

Define CP as the current chosen pixel position in units of array pixels

The setup procedure also establishes the position of the crosswise sealed pixels at the chosen resolution. Loop through CHR pixels, starting with CP set to CHT and incrementing CP by DY each time until CP reaches CHB. One statement for doing this is:

*FOR(CP=CHT, CP<CHB+DY/2, CP+DY)*

The incremental method accumulates errors in DY, therefore DY and CP must be calculated in 32 bit fixed point, with 18 to 20 bits after the binary point. Assuming 4 fractional bits to match an EPIX resolution of 16, 2 more bits so this round-off error is less than the impulse round-off error, and 11 more bits to undo the systematic error accumulation over 2,000 pixel cycles, at least 17 fractional bits are needed. On the other side, to accommodate an array resolution of 3000, at least 12 bits are needed to the left of the binary point, leaving 20 available for the fraction.

Once the above calculations are performed, the normalized scan line is received in step 253.

Next, the following variables are defined to center the sinc impulse on the current pixel in step 257.

| | |
|---|---|
| IMPULSE | integer impulse array loaded by host start of scan |
| PIX | a position in IMPULSE in unites of array resolution pixels |
| IPW | (ImPulse Width) width f IMPULSE in whole units of PIX beginning at 0 |
| FPIX | (Fractional PIX) number of elements in IMPULSE between integer PIX |
| Cp | defined above, passed to inner loop from outer loop |
| AP | closest whole array pixel to the current chosen resolution pixel CP |
| EP | difference between CP and AP quantized to EPIX |
| find: | AP = INT(CP + 0.5) <br> EP = CP − AP (precisely) <br> EP = ((INT((EP + 1)*EPIX + 0.5))/EPIX) − 1(quantized to EPIX) and set accumulator = 0 | if for this loop:
P > 0            EP = 0            EP < 0
For(N = IPW + 1,N IPW,N ++) For(N = IPW,N <= IPW,N ++)
For (N = IPW,N < IPW − 1,N ++)

The normalized pixels are multiplied by the sinc impulse in step 259 and summed and stored in step 261 by incrementing the accumulator by the equation ARRAY__IMAGE(AP+N)*IMPULSE(abs(n−ep)), and repeating it for all normalized pixels in the impulse window. At the end of the loop, divide accumulator by 128 and store value into current pixel.

Figure 8A:
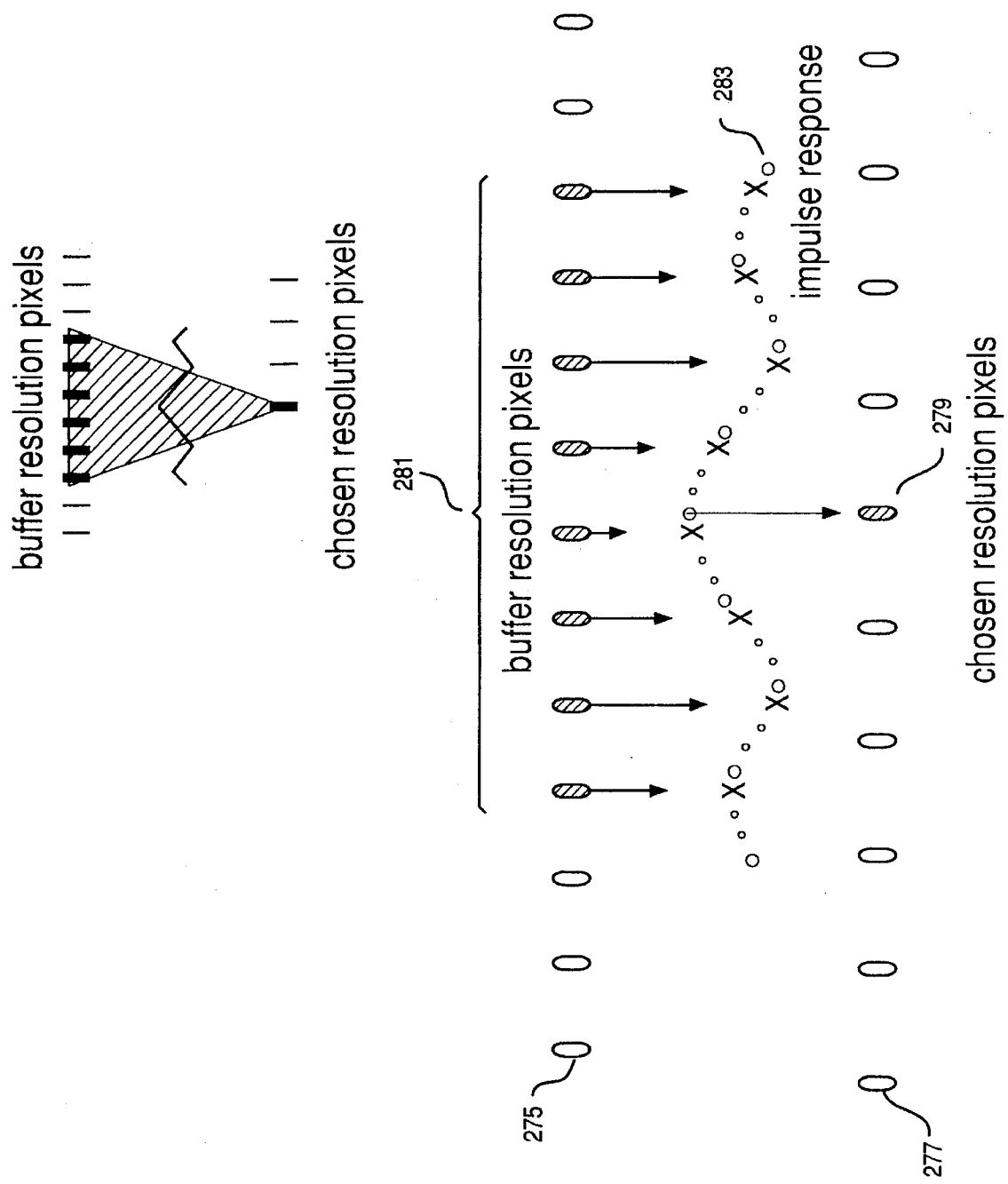
FIG. 8A is a diagram of the translation of the crosswise scaled pixels to the chosen resolution pixels in the lengthwise scale process.

The lengthwise scale process is similar in concept to the crosswise scale process differing in direction and other details. As shown in FIG. 8A, a plurality of cross scaled scan lines must be queued in the lengthwise scale buffer to make available a row of pixels 275 to calculate a pixel 279 in a row of pixels 277 forming with other calculated rows, the column of pixels forming the lengthwise scaled scan line. Thus, the buffer must be significantly larger than in the crosswise scaling process. Further, the spacing between the crosswise scaled scan lines, while significantly improved by the lengthwise prescale, is not totally uniform. The "position" routine actually measures the positions of these prescaled scan lines. Because "prescale" acts based on past positions and extrapolations, these prescaled scan lines may not be placed with perfect uniformity. The precision lengthwise scale now acts on the measured data both for the line being rescaled, and also in the buffer for lines on each side, so the precision scale can find exact positions and use these to give accurate scaling. If the sinc function is used, 10 or more crosswise scaled scan lines will be needed to produce a single lengthwise scaled line to provide a wide enough window to encompass several lobes of the sinc response. If the chosen lengthwise resolution 277 is coarse compared to the lengthwise prescale resolution 275, more lines will be required to encompass the lobes of the sinc response.

Figure 8B:
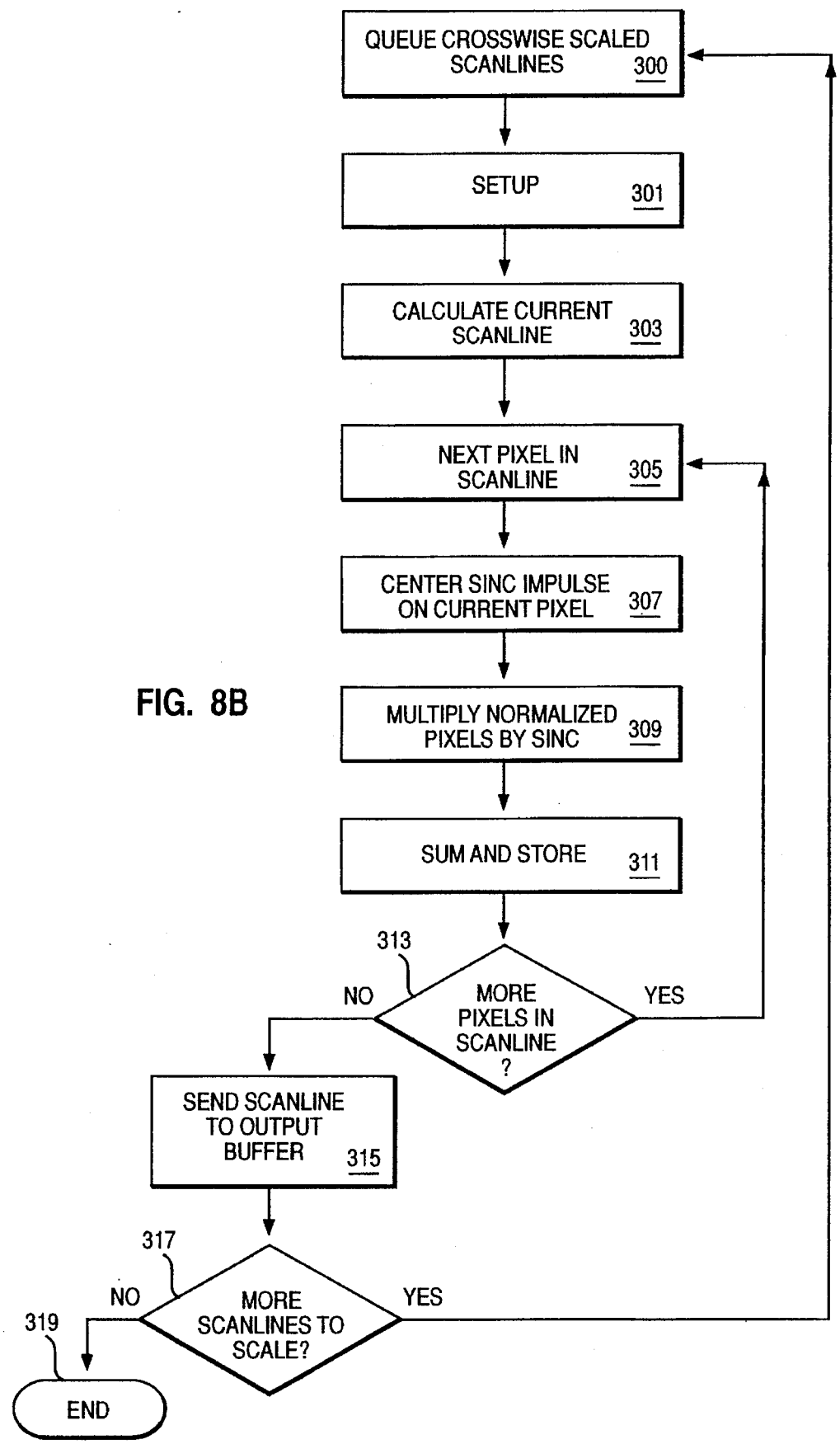
FIG. 8B is a flow diagram of the lengthwise scale process.

Referring also to FIG. 8B after the required number of crosswise scaled scan lines for the first lengthwise scaled line have been queued in step 300, tracking is called to determine the location of each scan line during the setup step 301.

After setup, the first lengthwise scaled scan line at the chosen lengthwise resolution is calculated pixel by pixel, step 303. The next chosen pixel 279 is entered with the next pixels 281 at the current pixel position in the crosswise scaled scan lines within the impulse window in step 305. The sinc impulse 283 is centered on the chosen pixel in the next step. The position of the chosen pixel relative to the scan lines in the buffer is determined by the measured position. The integer position selects the closest prescaled scan line, the fractional part determines the offset, or phase of the center of the sinc function relative to that closest prescaled scan line. Each of the crosswise scaled pixels is convolved, or multiplied by the sinc function value corresponding to its location, step 309. The results are summed and stored as the current pixel in the lengthwise scaled line, step 311. The sinc function as stored can be normalized so all points add to unity to avoid a division at this point. A test in step 313 is performed to determine whether there are more pixels in the scan line. If so, the next set of pixels in the crosswise scaled lines is stored and the process repeats to step 305. If not, the lengthwise scaled scan line is finished and stored in the output buffer step 315. A test in step 317 is performed to determine whether there are more scan lines to be lengthwise scaled. If so, the required number of new crosswise scaled scan lines are queued, step 300, the oldest unneeded crosswise scaled scan lines are dumped and the process setup for a new lengthwise scaled scan line. Once the scan is finished, the process ends, step 319.

Crosswise scale relys on the array resolution being relatively constant across the scan, while lengthwise scale has used a prescale to feed the "Sinc" resize section between the buffer and chosen resolutions with a relatively constant resolution. This "Sinc" resize, described above, is conceptually the same as that in the crosswise scale, the only conceptional difference is that one is vertical and the other horizontal.

Once the lengthwise scale process gives the corrected image at the chosen grid pattern the image is ready to be transmitted to the computer for storage, transmission, display, or further processing. Those skilled in the art would readily understand that variations from the detailed embodiment described above can be made without departing from the scope of the invention.

Although the process described above has a single value for each pixel, in practice, there are separate red, blue and green scans. The same process steps described above are repeated sequentially or interleaved within for each of the scans.

In the sections below, two separate, but interrelated inventions are described. The Reference Grid section describes a preferred means for providing the position of scanning which might be used in a variety of scanning processes. The Sinc Filtering section describes the advantages of a particular method of filtering image data which is not practiced by the prior art.

Reference Grid

The scanning process described above is critically dependent on the accurate knowledge of the position of the scan line in both the horizontal and vertical directions to compensate for the errors introduced by the inexpensive transport mechanism. Although there are many possible ways to obtain the position information, such as using a positional encoder on the transport or motors driving the transport, one preferred means is described in the section below. This means is preferred because it images through the same optical system as the image and therefore both the sensing of position and the image are affected in the same way by the single optical path, giving very good correlation between measured errors and actual errors.

Figure 9A:
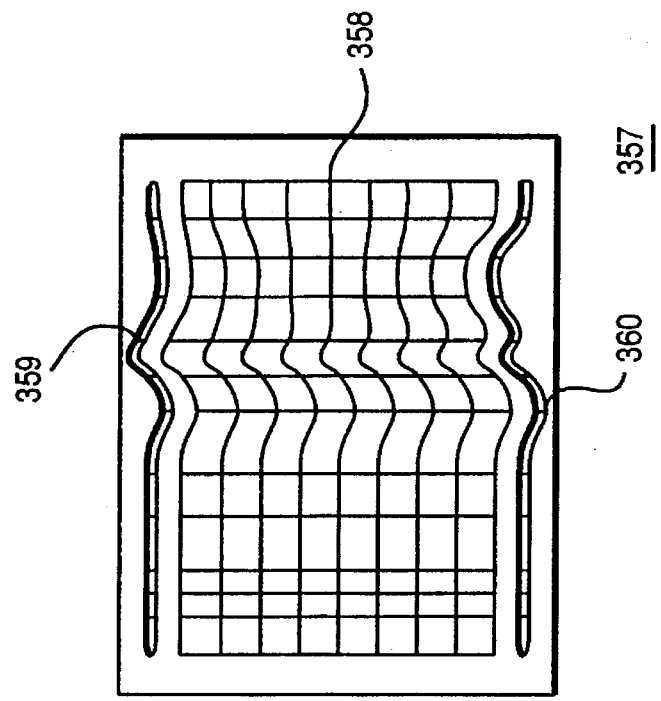
FIG. 9A is a diagram illustrating how an image and associated reference tracks are distorted in the scanning process.
Figure 9A:
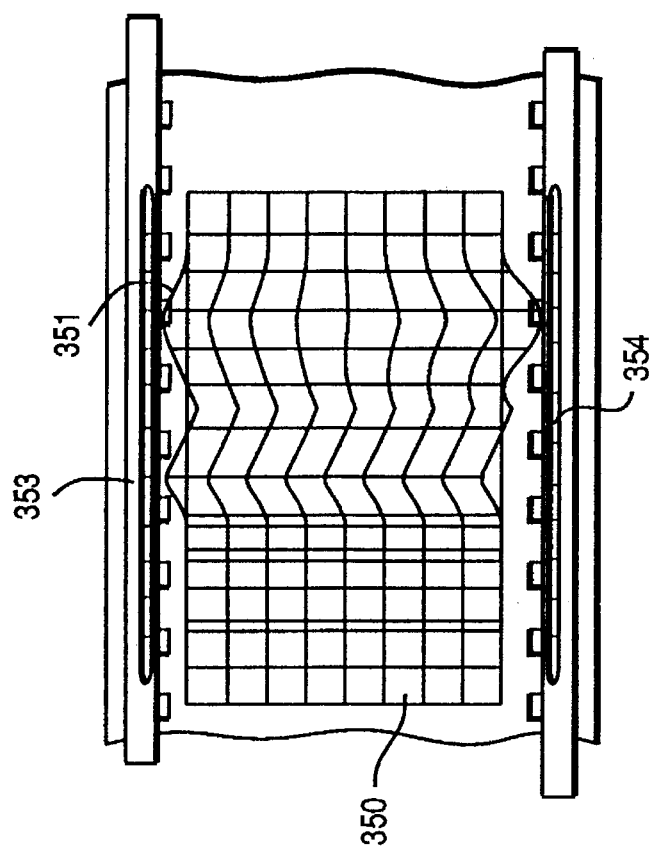

Suppose the scanned image has a grid pattern 350, illustrated with thick lines in FIG. 9A. The distortion introduced by the transport is illustrated with thin lines superimposed over this image. In addition, a reference grid is disposed proximate to image. In this case, the grid is established by two reference tracks 353, 354 flanking the image, although other configurations could be used. According to the preferred embodiment, the CCD scans an area including both the image and the reference tracks. The resulting scanned image 357 appears above right. The grid pattern 358 in the image distorts in a complementary way to the distortion induced by the mechanical jitter. The reference tracks 359, 360 also distort the same as the image.

Figure 9B:
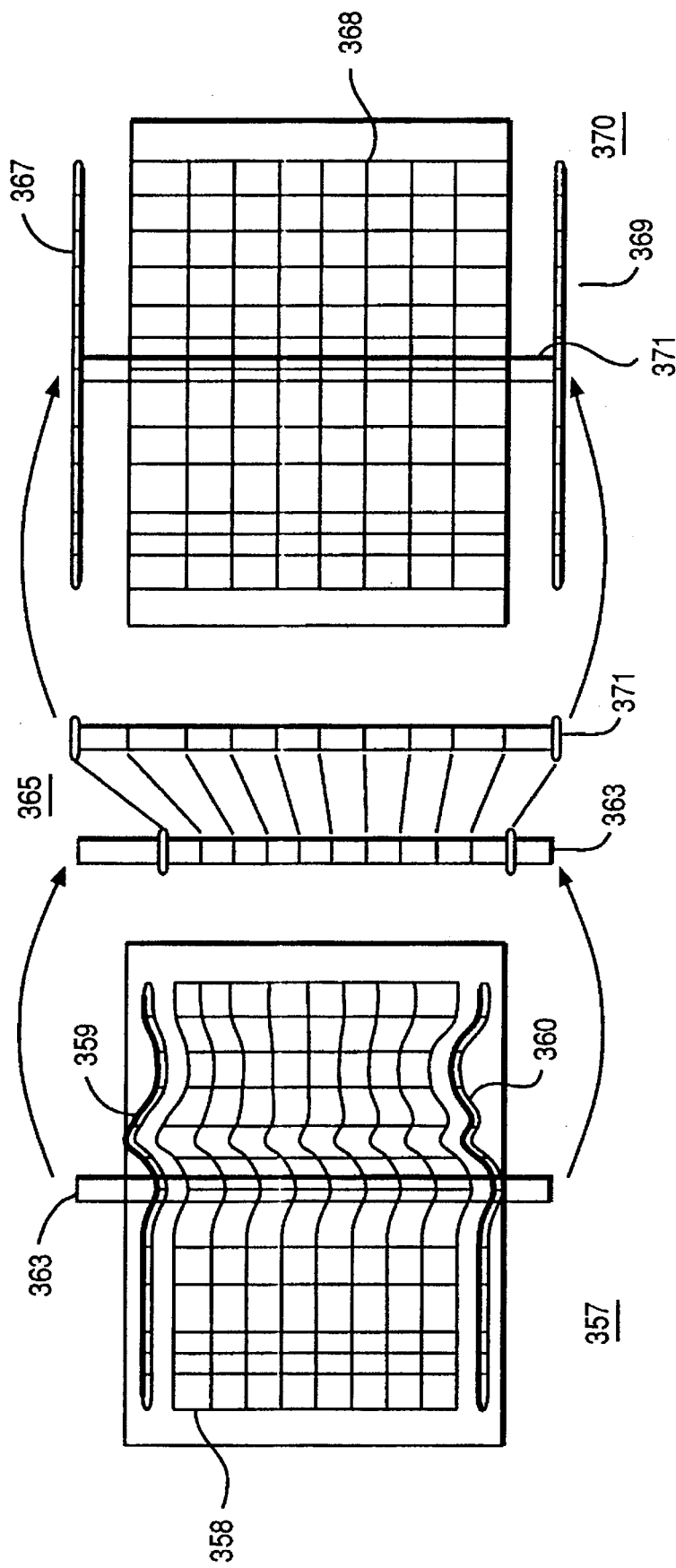
FIG. 9B is a diagram of the reference tracks and the film during the crosswise scale process.

The reference tracks define the position needed to correct the distortion in the scanned image. In the scanning process discussed above, the correction is decomposed into two steps, each operating on one dimensional lines of pixels. For the sake of simplicity, the lengthwise prescale process discussed above is omitted; if the hardware was predictable within a certain uniformity, the step is not necessary. In FIG. 9B, the crosswise scaling process using the reference tracks is illustrated. For each pixel column in the scanned image 357, the position along the column of the reference tracks 359, 360 is found, then this column of pixels is resized using a one dimensional process which is constant across the entire line, such that the reference tracks 367, 369 appear at predefined fixed points along the resized columns. The resulting intermediate image 370 is shown in FIG. 9B.

Figure 9C:
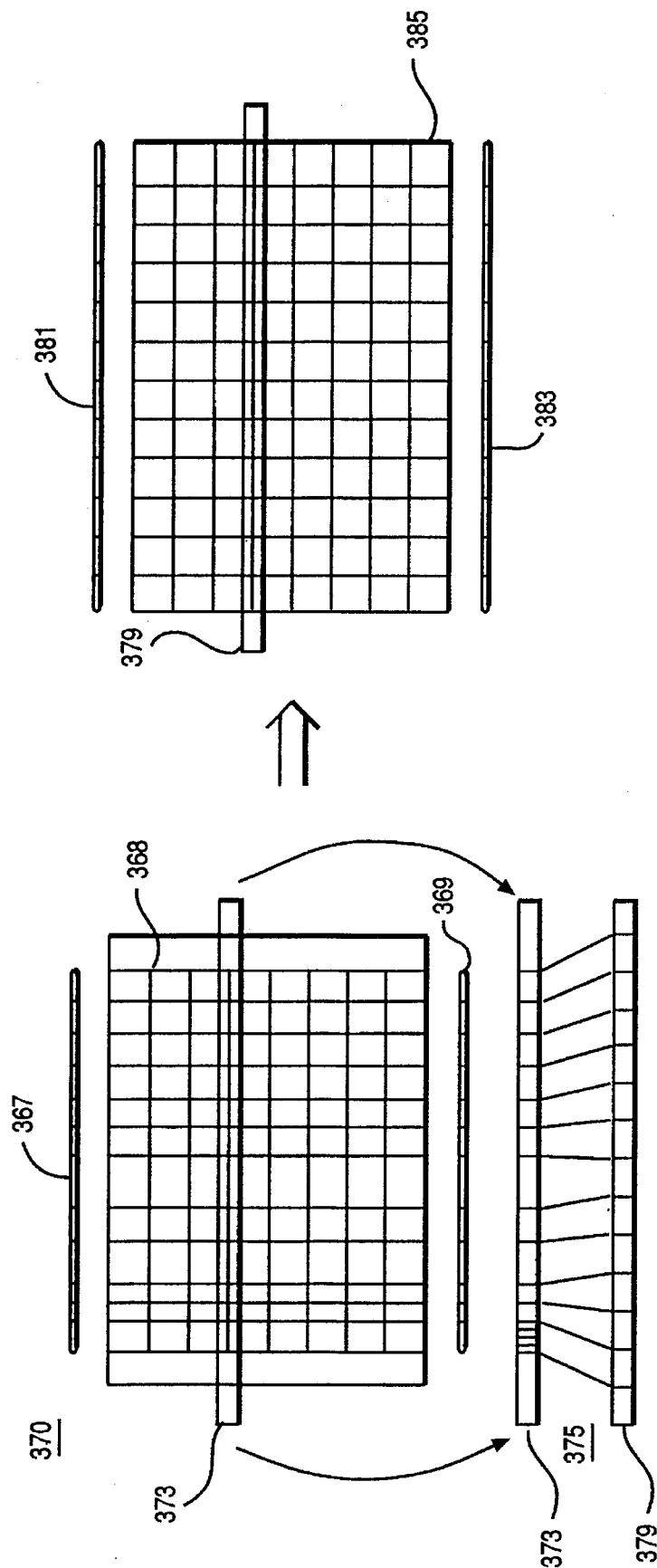
FIG. 9C is a representation of the reference tracks and the film during the lengthwise scale process.

Next, as shown in FIG. 9C, each pixel row of the intermediate image 370, is resized, in the lengthwise scaling process 375 using a one dimensional resize. For this case, the resize factor may vary across the pixel row 373 as the scanning process may not be completely uniform. The displacement of each point on the resized row 379 is defined by the reference tracks such that the marks on the reference tracks 381, 383 in the corrected image 385 become equally spaced. The positions in two reference tracks 367, 369 in the intermediate image can be averaged for their respective columns and the result used for all rows. If, however, there is twisting jitter, then the average for each row must weight the two reference tracks in proportion to their proximity to that row.

The reference tracks must disclose vertical position and relative horizontal position. They may also disclose absolute horizontal position. All of these positions could be coded into the reference track so that it is available for each individual scan line, or in a way that the positions may be interpreted from several scan lines together. The illustration in FIG. 10B portrays a preferred reference track 400, and also graphs the signal 401, 402, 403 retrieved from three adjacent scan lines.

The vertical position 405 is the simplest, and also the most critical because it provides the positional "clock" pulse that synchronizes the reading of other information from the reference track. A single horizontal stripe suffices, but several stripes give redundancy against dust or defects. Two stripes are depicted in the figure.

The relative horizontal position indicator could be simply a set of vertical lines. This would give an incremental disclosure of position for each scan line that crossed the boundary of a grid line. The position of intermediate scan lines would be interpreted by averaging between such boundary scan lines. An improved method slants the grid lines in region 407, providing a continuous edge to interpret the position of each individual scan line relative to adjacent scan lines. In the figure, each line slants far enough to overlap the top of the next line with the bottom of the previous line so the interpretation can make a blended transition.

Figure 10A:
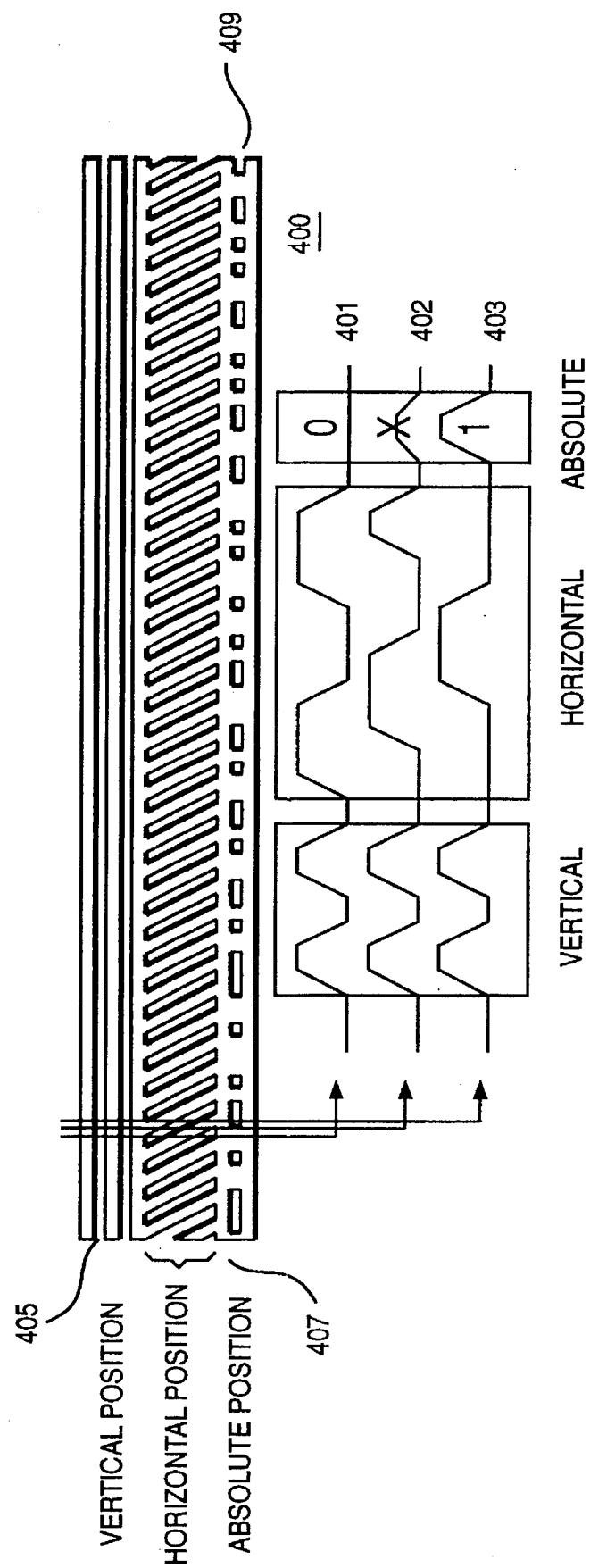
FIG. 10A is a detailed drawing of an embodiment of the reference tracks using a single clock track.
Figure 10B:
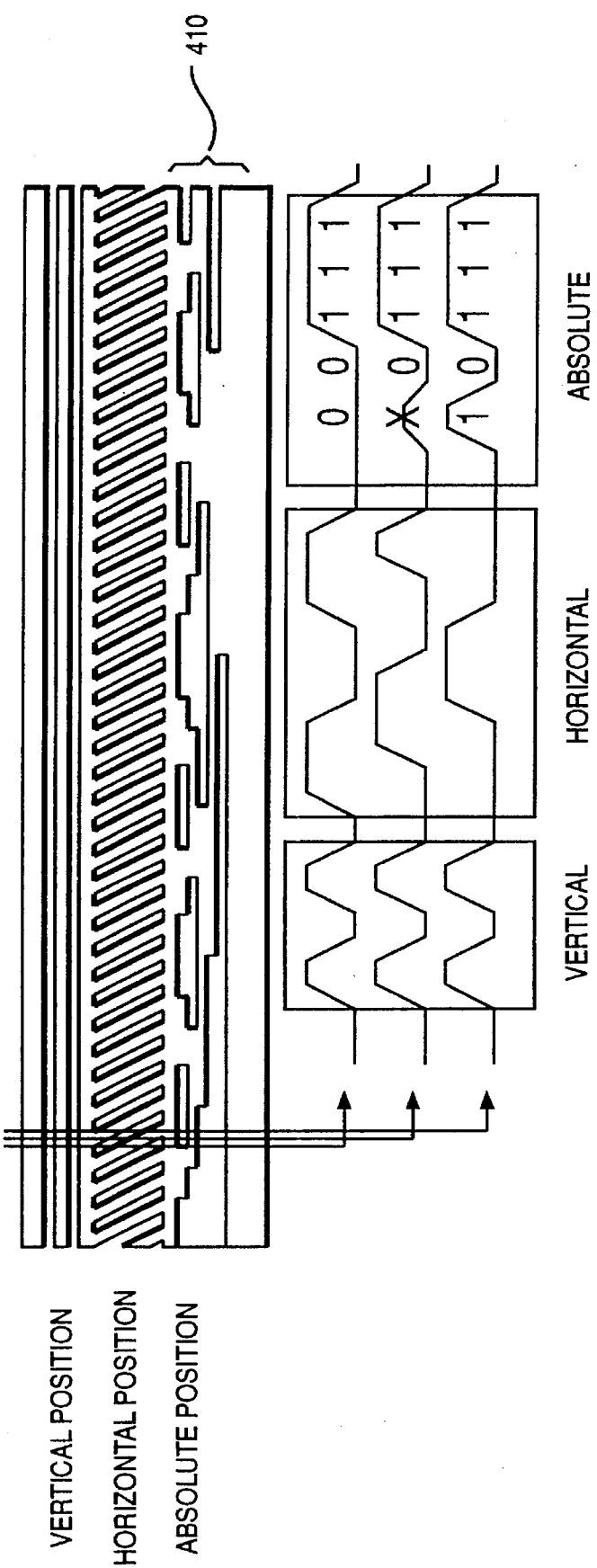
FIG. 10B is a detailed drawing of a preferred embodiment of the reference tracks using a gray code track.

The relative horizontal position uses a tightly repetitive pattern 407 to minimize jitter in interpreting position. This mandatory repetition precludes coding absolute position. The computer could maintain absolute position by retaining count of each line scanned. Also, the slanted line technique does maintain integrity through a change of scanning direction which vertical lines could not. However, there are situations in which the computer could lose real time tracking, and the ability to recover an absolute position would save starting a scan over. An embodiment shown in FIG. 10B would be to include an absolute positioning code, such as a gray code 410, which would include several clock lines, so each scan line is "time stamped" with an absolute position within an acceptable resolution, e.g., 1/10 mm. In FIG. 10A, only a single clock line 409 is illustrated which signals absolute position. The absolute position is interpreted across several scans using coded clock techniques that are common in the art. FIGS. 10A and 10B illustrates a combined method of using a digital track for absolute positioning with limited resolution, and the diagonal vernier track add the precision, unquantized resolution.

The vernier reference track signal itself jitters from pattern raggedness, dust, blurring, and sensor noise. Pattern raggedness can be detected once and corrected in a lookup table. Most variations induced by the reading process is random between scan lines, but momentum causes mechanically induced variations to change slowly. The goal of course is to measure the mechanical variations, and to reject the variations falsely added by the reading. Averaging several scans reduces the rapidly varying reading variations, but preserves the slow mechanical variations.

Figure 10C:
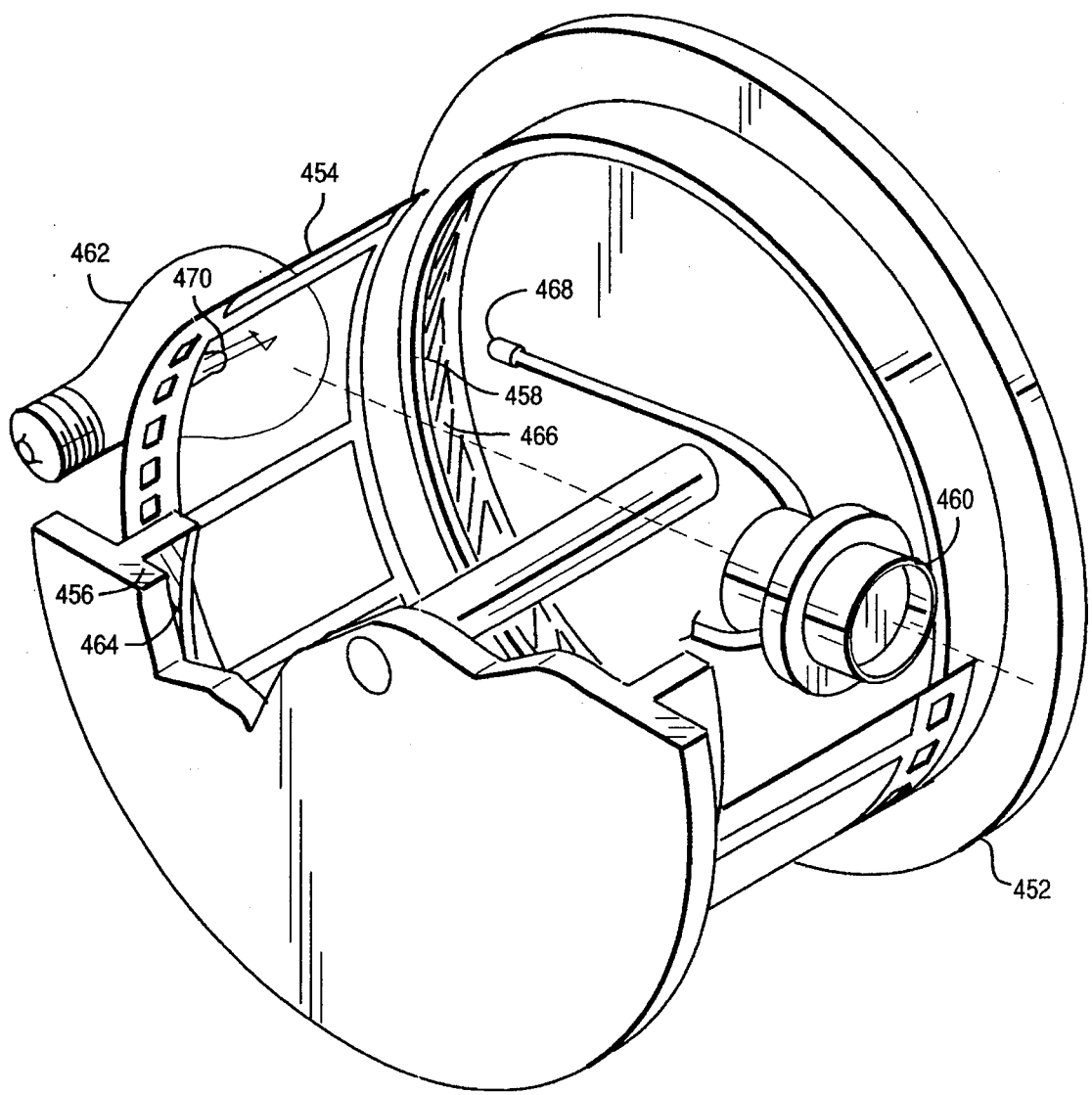
FIG. 10C shows the relation of the reference tracks to the lights, film holder, and optics.

Turning now to FIG. 10C, the relationship of the reference tracks is shown relative to the film and film holder. The wheel 452 holds the film 454 on a left and right flange 456 and 458. The imaging lens 460 views the film as transilluminated by the lamp 462. The left reference track 464 are disposed on the back of the left flange 456, and the right reference track 466 on the back of the right flange 458. The tracks may be illuminated by small light emitting diodes 468 and 470 supported close to the flanges. The reference tracks themselves may be printed on photographic paper to produce a white on black pattern and adhered to the flanges with adhesive. In the preferred embodiment, they are laser etched on thin strips of stainless steel and attached to the flanges with adhesive. Other techniques such as deposition or photolithograph may be used to place an alignment track on the wheel depending on the desired resolution. The greatest possible resolution is bounded by the capability of the optical system. In general, the alignment tracks should contrast or reflect relative to the background on which they are placed.

Sinc Filtering

An "alias" is a false name. When a pure frequency is sampled, sometimes that pure frequency takes on a false frequency or alias. The maximum reproducible frequency, named in honor of Nyquist, is that for which alternate samples are at the peak and valley. Any frequencies below the maximum frequency are reproducible.

Figure 11:
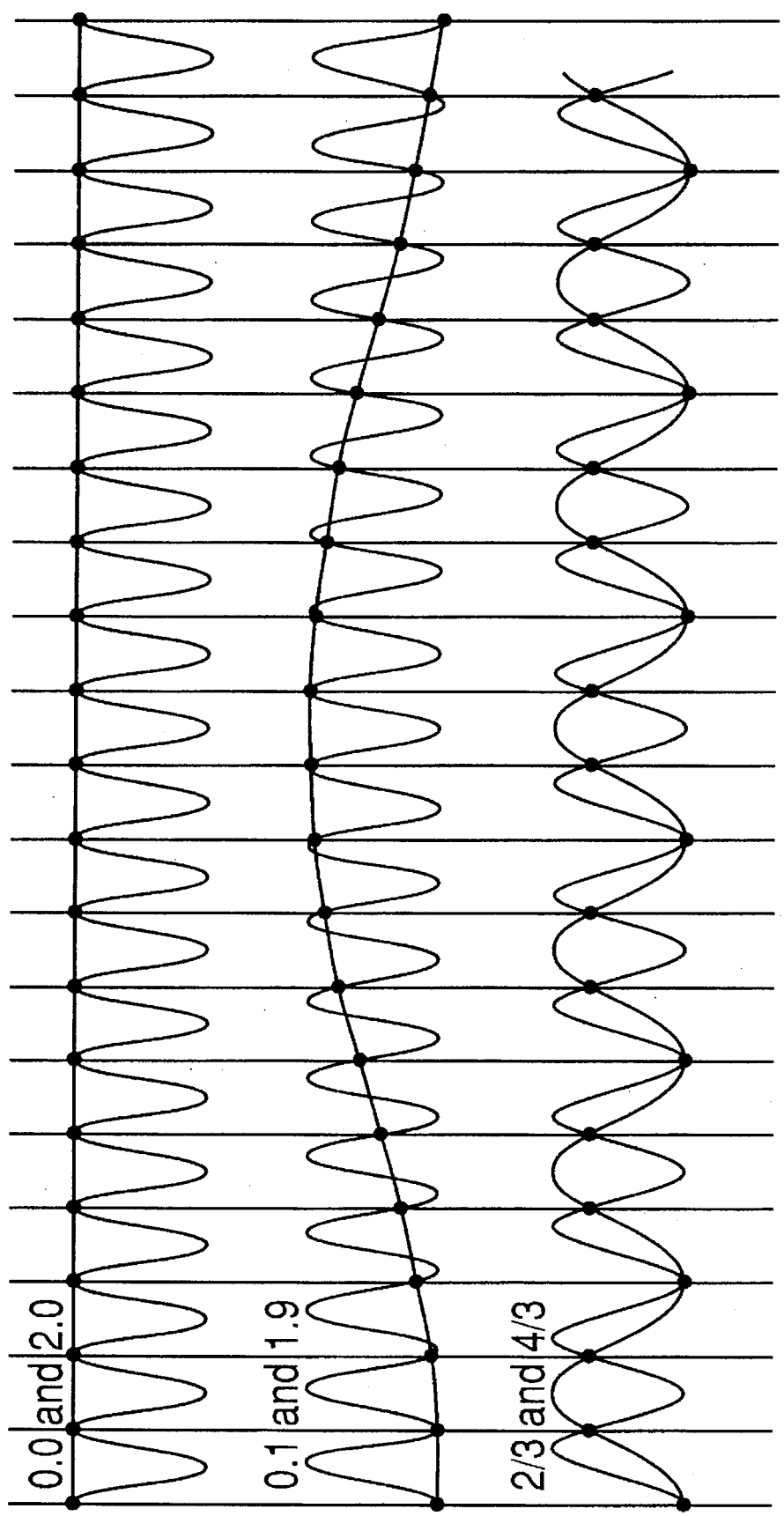
FIG. 11 portrays the origin of aliases caused by digitally sampling a continuous signal.
Figure 12A:
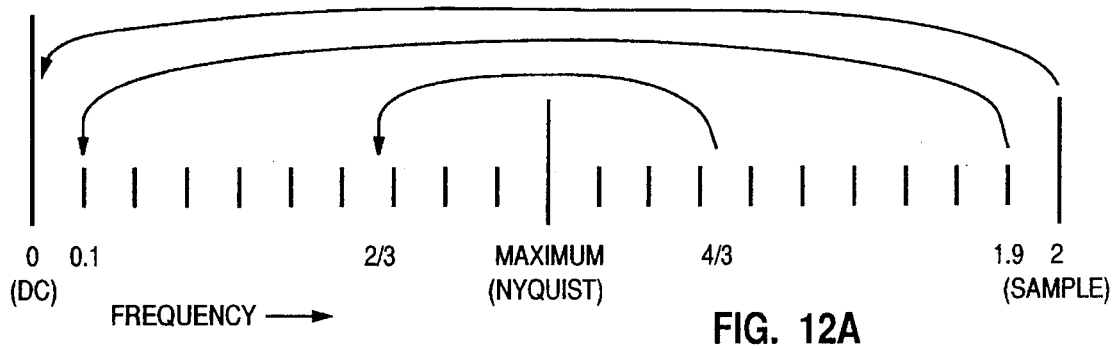
FIG. 12A maps the mirroring of aliases around the Nyquist frequency from higher frequencies back to lower frequencies caused by digitally sampling a continuous signal.

Referring now to FIGS. 11 and 12A, when frequencies above the maximum frequency are sampled, they produce results identical to a lower frequency. A frequency of 4/3 times the Nyquist frequency yields the same samples as a frequency of 2/3 of the Nyquist frequency. A frequency of 1.9 Nyquist yields the same samples as a frequency of 0.1 Nyquist, and a frequency of 2.0 Nyquist yields the same samples as a frequency of 0.0 Nyquist. In effect, the frequency spectrum is folded at the Nyquist frequency. Any frequencies above that get folded back to alias frequencies below the fold. Actually, the spectrum gets pleated, because the folding continues back and forth to infinity. Where the pure frequency is at the Nyquist frequency, it folds back on itself as its own alias. Depending on phase, the frequency and its alias may add or may cancel. Shifting a wave at the Nyquist frequency 90 degrees would result in all zero samples, a result of the signal and its alias canceling each other.

Figure 12B:
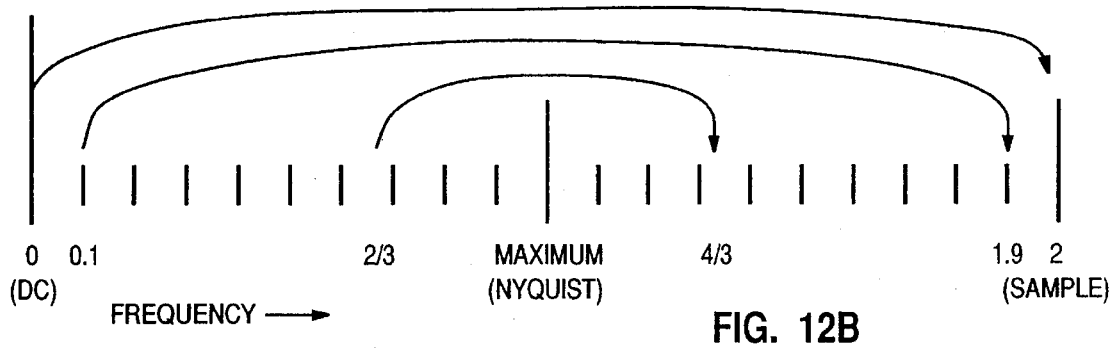
FIG. 12B maps the mirroring of aliases around the Nyquist frequency from lower frequencies to higher frequencies caused by reforming a digitally sampled signal into a continuous signal.

So far aliases caused by sampling a continuous signal have been considered. Referring now to FIGS. 11 and 12B, consider aliases caused by converting a sampled signal back into a continuous signal. The samples generated by a frequency of 2/3 the Nyquist frequency contain both the 2/3 of frequency and also an alias 4/3 frequency. The samples from a 0.1 frequency also bear a 1.9 frequency. The spectrum is again pleated. The 0.1 frequency contains aliases from 1.9, 2.1, 2.9, 3.1, frequencies and so on to infinity.

Figure 13:
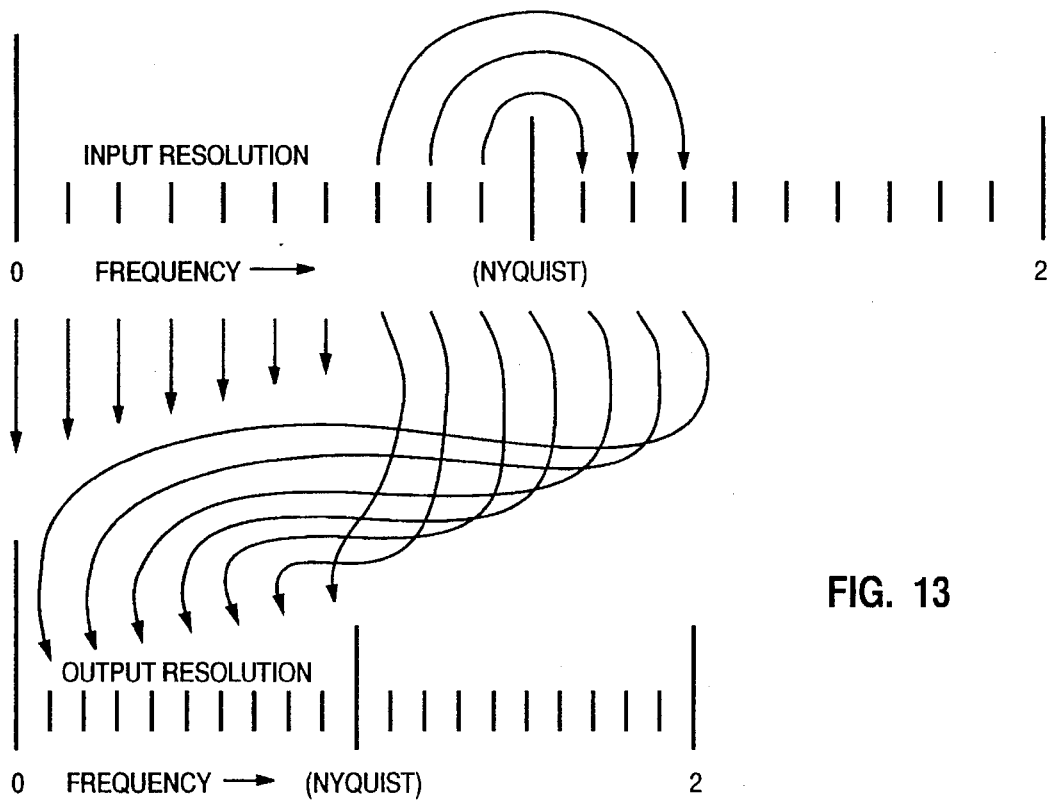
FIG. 13 maps the multiple mirroring at aliases caused by digitally sampling at a first resolution, and then resizing that digitally sampled signal to a second resolution.

If an input signal is sampled and resampled to another resolution, the problem is further exacerbated. For example, if the input signal was sampled at a frequency of 6 per inch, and is resampled at 4 per inch, the Nyquist frequency of the input grid is 3 cycles per inch, and for the output grid it is 2 cycles per inch. Referring to FIG. 13, the base frequencies transcribe correctly. Then the higher frequencies available to the input resolution alias in the resampling. Finally, the same higher frequencies also alias as still higher frequencies in the input grid and realias as still lower frequencies in the resampling. All this assumes the original sampling at the input resolution was alias free, else there are more aliases that there were in the KGB.

All digital signals are composed of samples. When sampling a signal, the frequencies above the maximum frequency should be removed or they will fold back over the low frequencies as noise. In imagery, this noise appears as staircasing and more. Also, grain aliases back, making the image grainier than it should be. This grain alias is not as obvious as an artifact, and is therefore more insidious. "Experts" often falsely claim that digitized images are grainier than analog because digital is "sharper".

An analog anti-alias filter is simply a low pass filter that removes frequencies beyond the maximum frequency. Most anti-alias filters do not have a sharp cutoff, therefore some of the aliases do get through, while some of the desirable higher frequencies just below the maximum get attenuated.

Figure 14A:
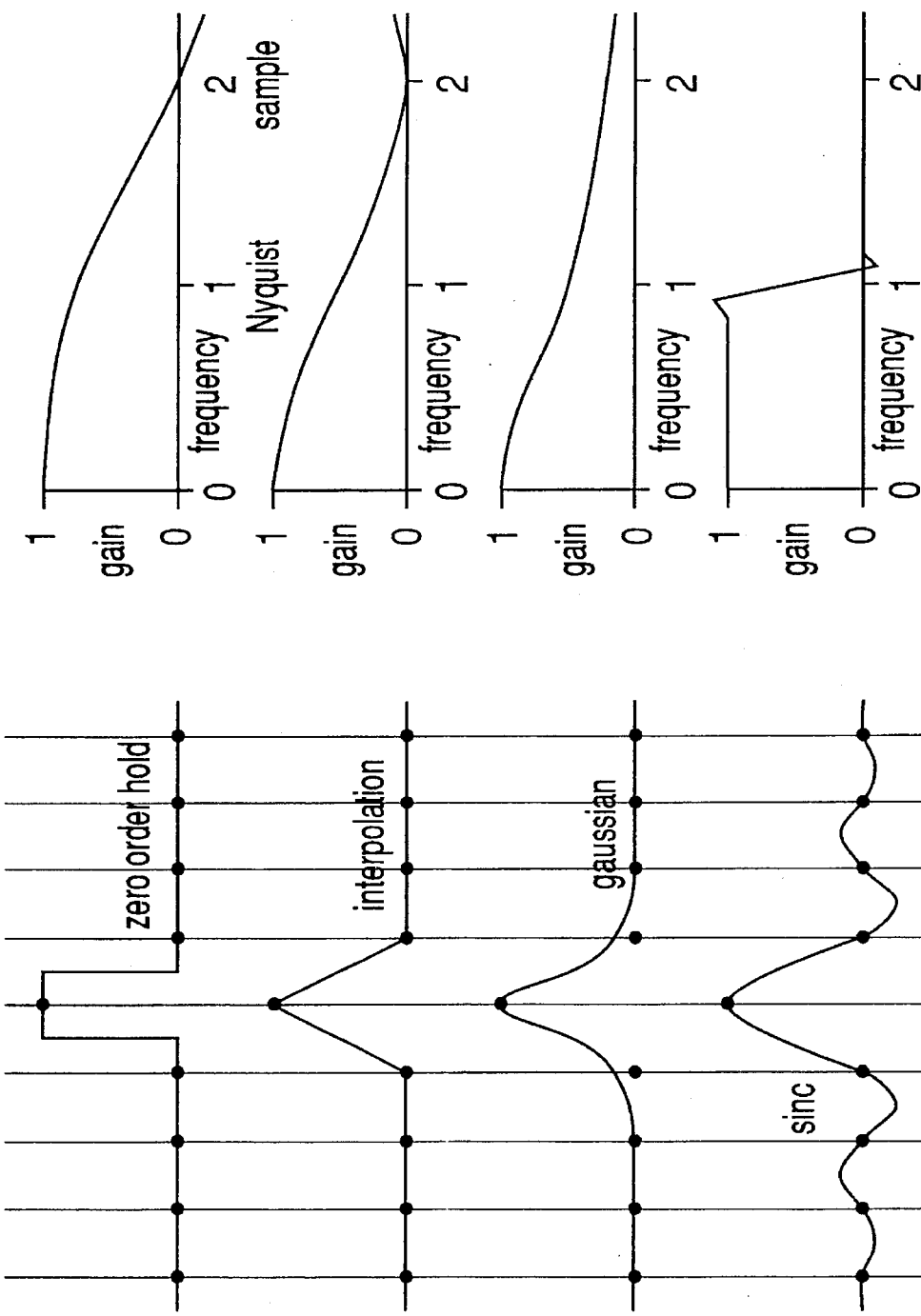
FIG. 14A portrays common filter impulse responses both in the spatial domain and in the spatial frequency domain.

The frequency response of several common antialiasing filters appears on the right of FIG. 14A. The effect in time or space on a single impulse of each of these filters, the so called "impulse response", is shown on the left of FIG. 14A. When looking at the frequency response, remember that any attenuation below the Nyquist frequency will blur the image, and anything passed above the Nyquist frequency will come back to haunt as an alias.

Figure 14B:
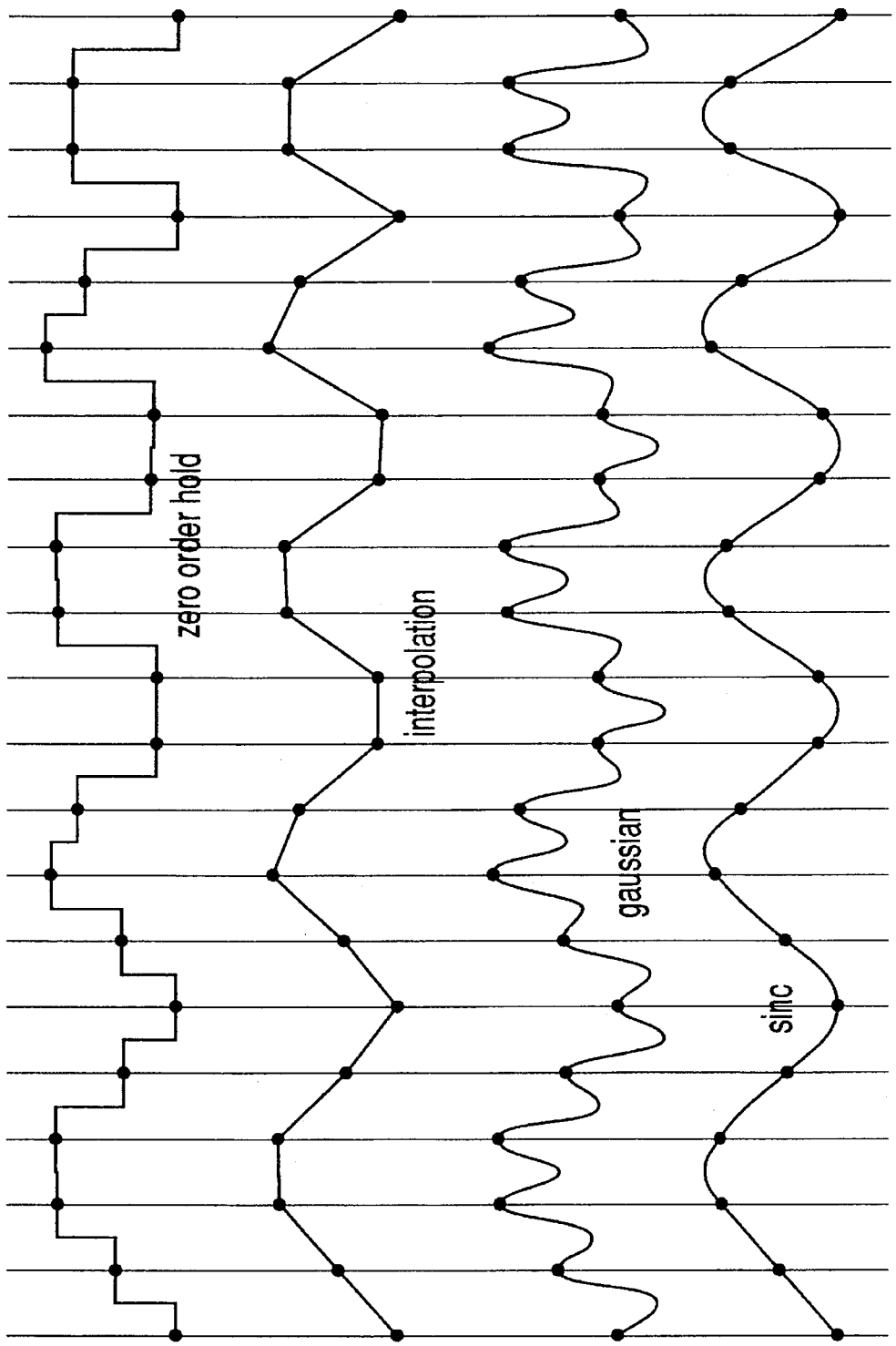
FIG. 14B shows the effect of applying the impulse responses of FIG. 14A to a sinusoidal signal.

The effect of applying each of these filters of FIG. 14A to a sinusoidal signal is shown in FIG. 14B. The raggedness in the signal recreations are actually the sum of the aliases left by each filter. The individual common filters are now discussed.

Zero order hold: The most obvious filter is to hold the sampled value for the full interval. In an image, this makes the square pixels that are better than the unfiltered array of pixel dots.

Interpolation: When better image programs say "antialias", they mean interpolation, or some other process applied uniformly between sample points, as seen in FIG. 14B. Note from the frequency response in FIG. 14A that the frequencies beyond the Nyquist frequency, and hence the aliases are suppressed quite a bit more with interpolation than with a zero order hold, however, the desired frequencies are also suppressed up to 50% by interpolation. Conventional wisdom is therefore that antialiased images are smoother, but less sharp.

Gaussian: To the electronic camera or monitor designer, antialiasing means introducing just the right amount of blurring to reduce the aliases without destroying the image. Note from the frequency response that a gaussian filter does not reach zero at the sampling frequency, and therefore, some of the sampling impulses come through. Those who build monitors, call this raster noise. Those who build digital cameras call this moire. In both cases, if it was objectionable, they both would blur the image more and explain that life is a compromise.

The prior art images filters have failed to provide the necessary filtering. The applicant proposes the use of a sinc filter. Mathematicians and digital audio engineers have used this function for a long time, but its use in image has been surprisingly absent. There are problems with its use which explains why prior practice has not used sinc filters, or when they have been used the results have been less than perfect but the applicant will explain how the problems can be overcome.

A sinc filter is sometimes called a "brick wall" because it passes everything up to a certain frequency, and beyond that lets nothing pass. When used as an antialias filter, it is very effective. The input resolution, i.e. the number of samples per inch or second, may be higher for the input than for the output, or may be higher for the output than for the input. In either case, the anti-alias filter should cut at the lower of the two Nyquist frequencies, i.e. should cut at half the sampling frequency of the input or output, whichever is lower.

Figure 14C:
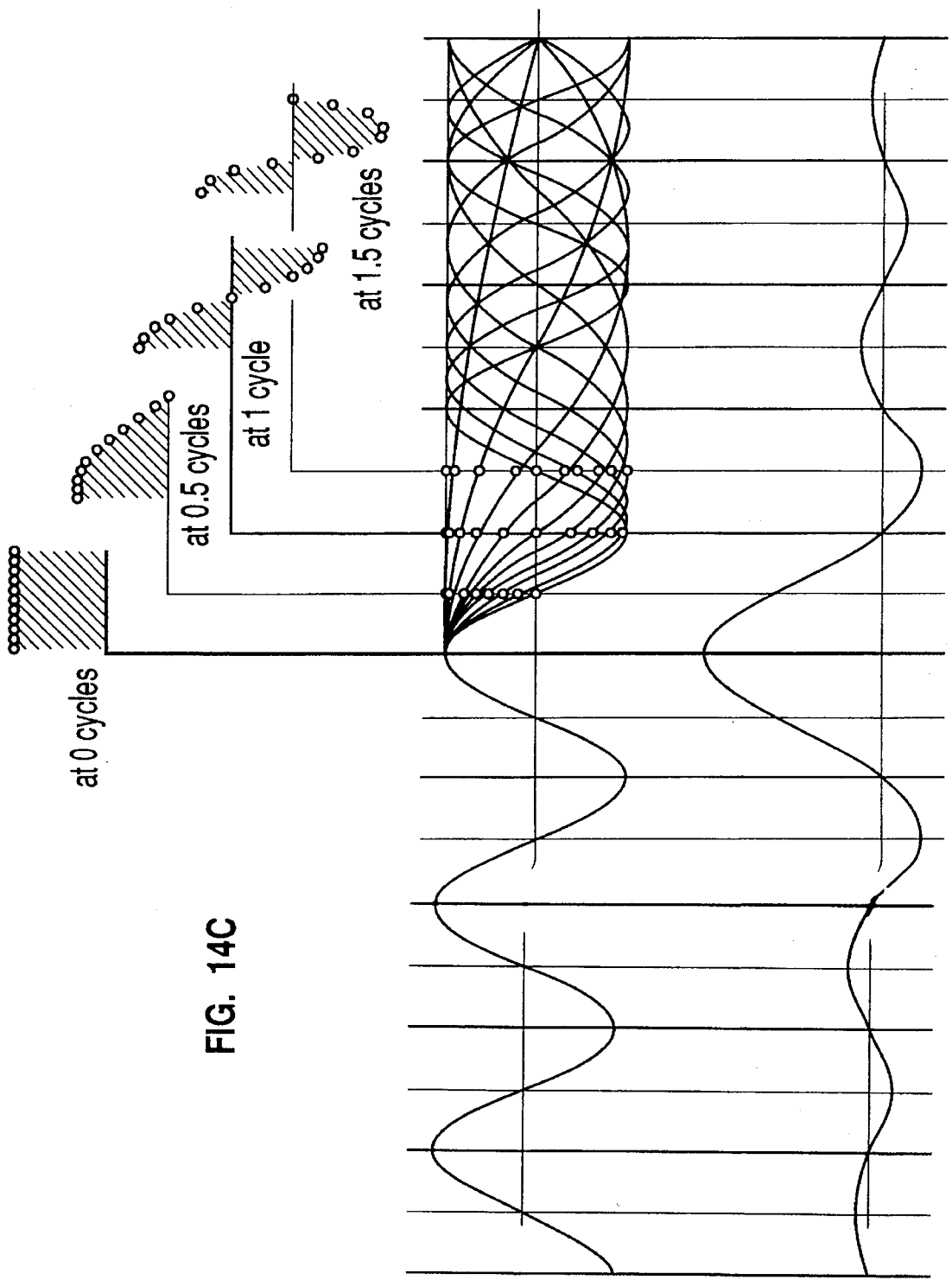
FIG. 14C illustrates the mathematical origin of the shape of a "sinc" filter.

The sinc function is the sum of all frequencies up to the Nyquist frequency, and none beyond. The Nyquist, or maximum reproducible frequency, is when each sample, shown by thicker vertical lines in FIG. 14B, as illustrated in FIG. 14C, alternates plus and minus. At the center, the maximum sum is reached, by 0.5 cycles from the center, some samples are down, and so the sum is less. By one cycle from the center, positive and negative samples cancel, causing the first zero of the sinc function. By 1.5 cycles from the center, there are more negative values to sum than positive. The sinc function oscillates through zero at each sample point except the center. The envelope of these oscillations decreases as 1/distance from the center. Stated mathematically, $sinc(x) = sine(x)/x$.

When applying an anti-alias filter, several samples at the input resolution are multiplied by the impulse response and added together to form each single sample of the output resolution. The range over which this "convolution" happens is the window width of the filter. To perform this convolution, take the ideal impulse response, center it on an output sample, and do the convolution on the part of the impulse that lies within the window. Sometimes the edges of the window are feathered as if by curtains. Curtains of different densities and shapes exist such as such as "Hamming" windows or "Harming" windows. For most image work, however, the best window is a bare, "square" window.

The sinc function could fill an infinite window. The envelope of the oscillations in a sinc filter decrease only as 1/distance from the center. The sum of 1+1/2+1/3+1/4+1/5+1/6+ . . . eventually reaches infinity. The sinc function itself converges because the sign alternates at each number, but the energy in the side lobes approaches zero so slowly that the practical widths are painfully broad.

Figure 14D:
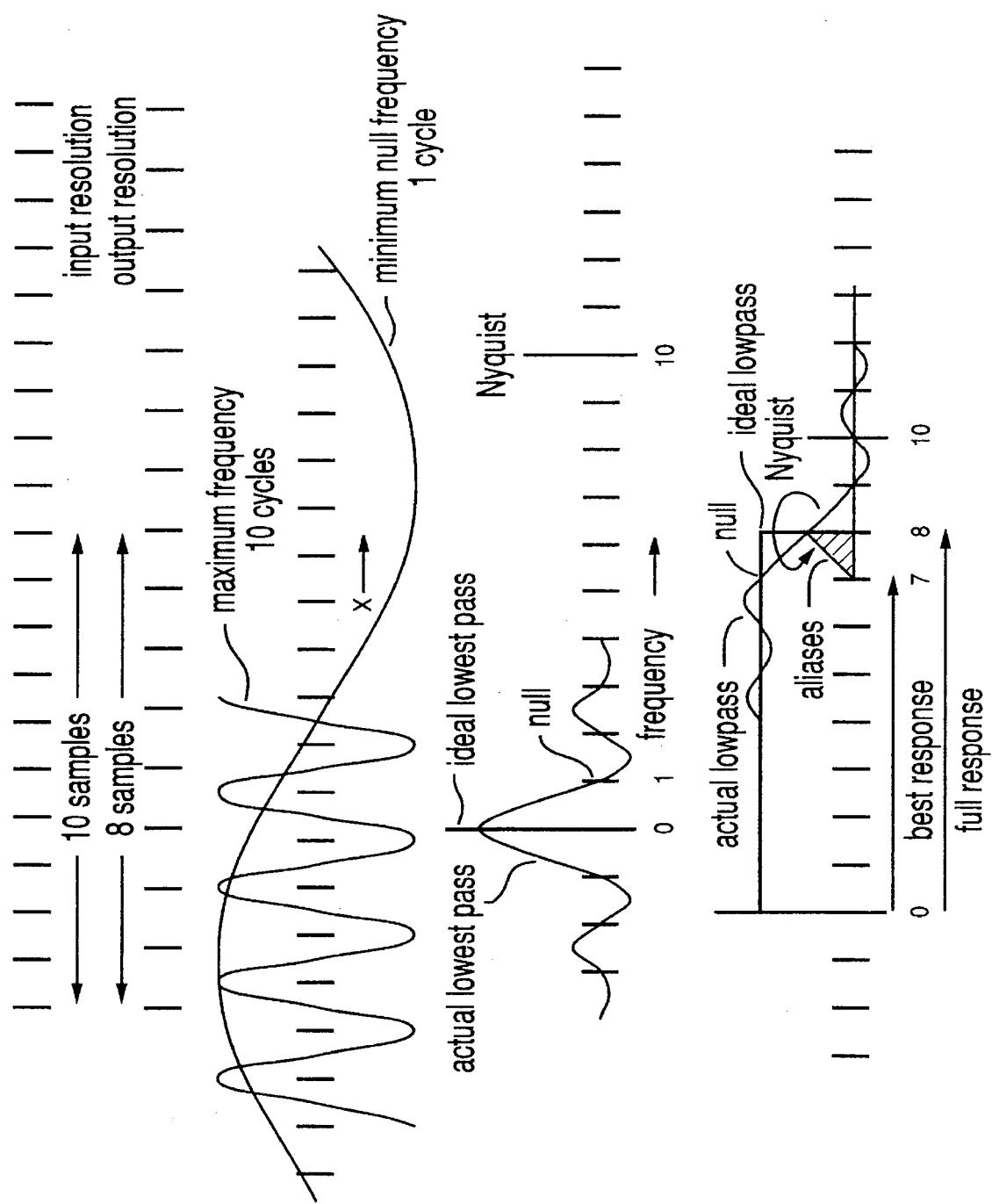
FIG. 14D illustrates the effect of limiting the width of a sinc impulse response.

How broad should the window be? Take an example, in FIG. 14D in which an input signal has 10 samples for every 8 output samples. Further assume the window is 20 input samples wide. The maximum reproducible frequency, or Nyquist frequency, is therefore 10 cycles across the window. First, using the lowest pass filter possible by averaging all 20 samples equally. A wave with one cycle across this window will have as many positive as negative points, and thus, will average to zero.

If all the input were "ideally" averaged, only the 0 frequency component would pass. By limiting the window to 20 samples, the actual lowest pass filter is as in FIG. 14D with the first null at one cycle.

The anti-alias filter should cut at 8 cycles, the lower of the input and output Nyquist frequencies. The ideal lowpass of an infinity wide sinc filter is blurred by the 20 sample window width in the same way as the ideal lowest pass filter was blurred. Thus, even with a 20 sample window width, the best response, i.e. the response region for which the gain is near unit and for which aliases are near zero, is lower than the full response by $1/10$ the Nyquist frequency. From this example, it may be seen that even with a window width of 20, very broad compared to, say, interpolation with a window width of only 2, that the sinc filter is still only about 90% as effective as a perfect filter. A window width of 200 would give about 99% effectiveness, and so on.

So far all the samples have been one dimensional, straight from digital audio. Images are two dimensional. For the sinc filter, this leads to a big problem. Suppose a window width of 20 pixels is selected. This is 20 pixels in each axis, forming a 20×20 square covering 400 pixels. If a window width of 200 pixels had been selected, the resulting 200×200 square needed to calculate each output pixels would require the access of 40000 input pixels!

The two dimensional Nyquist bandwidth of a square grid is also a square. For this reason, a sinc resize can linearly decompose into two one dimensional resizes. First, resize each row of pixels to form an intermediate image at the desired row resolution. Then, resize each column of that intermediate image to form the desired output image. With a 20 pixel wide window, this operation requires two 20 pixel convolutions instead of one very long 400 pixel convolution.

Figure 15A:
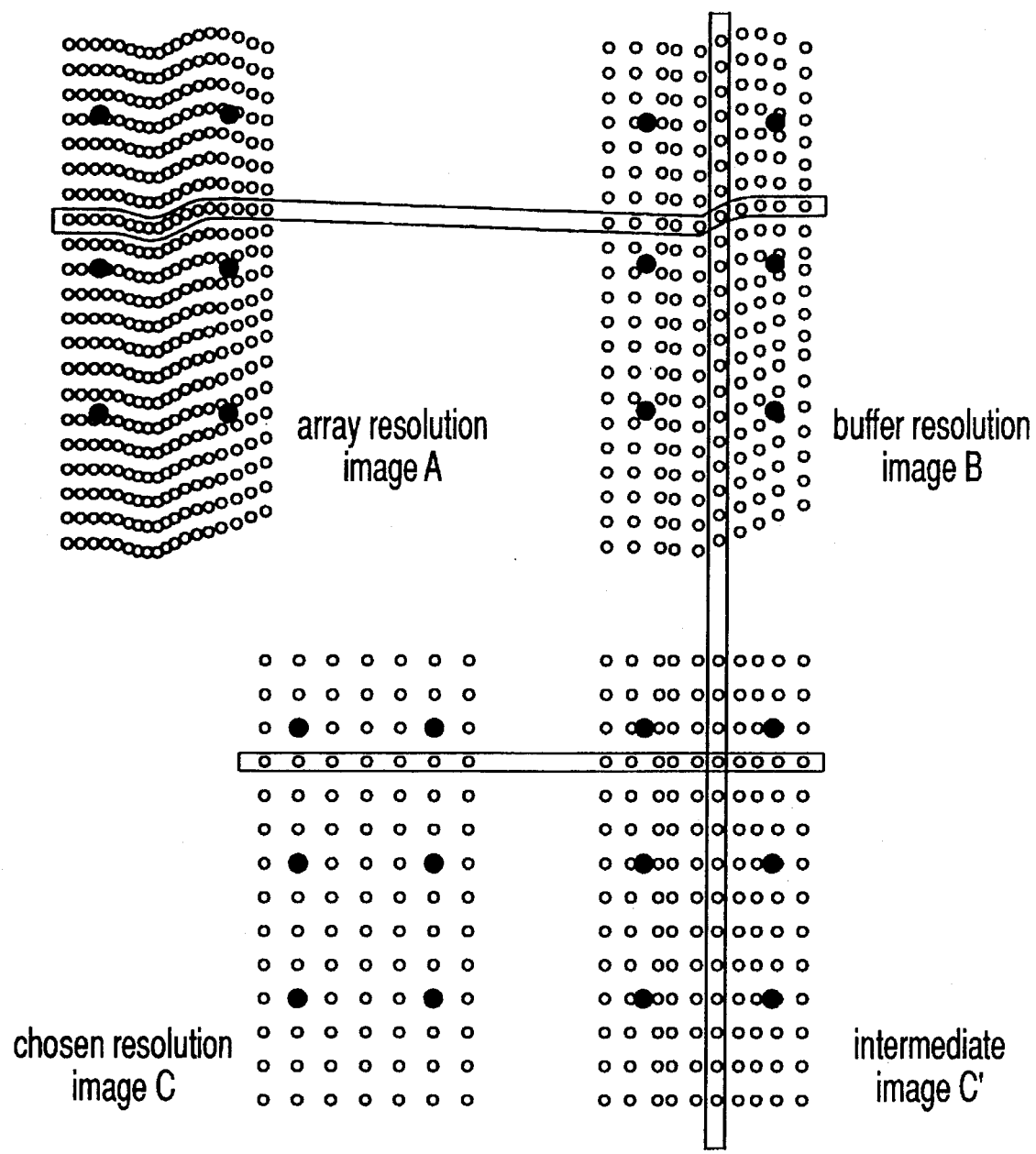
FIG. 15A shows how an image, distorted by speed jitter, lateral jitter, and size jitter as in FIG. 1, can be converted to rectilinear form according to this invention.
Figure 15B:
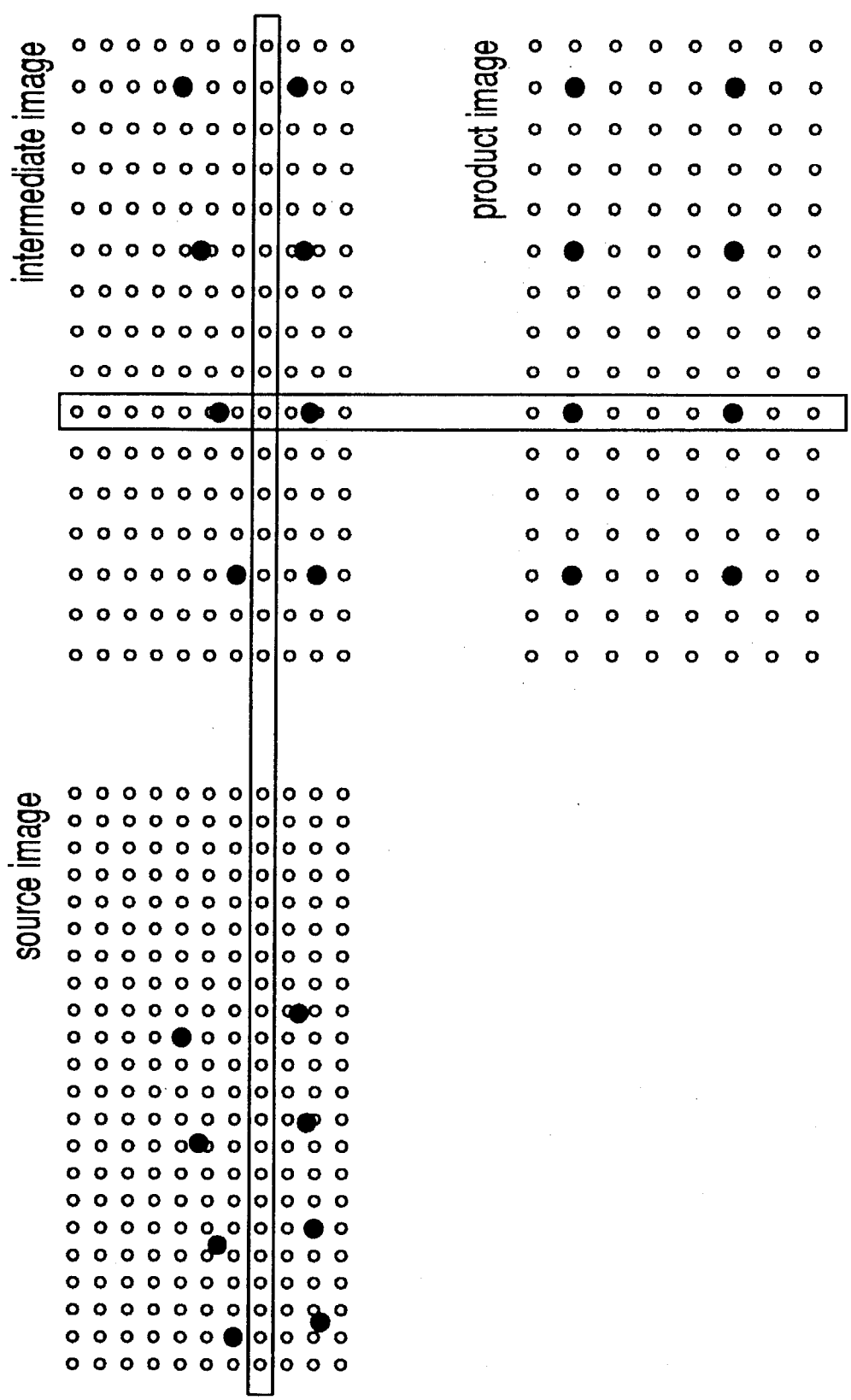
FIG. 15B shows the effect similar to that of FIG. 15A relative to the sample grid.

Tilt, keystone, and warpage can be included in the decomposed resize. First, each row is distorted as desired, then each column. In FIG. 15B, this process is shown modeled with fixed grids overlaid by a flexible product space. FIG. 15A models the process as flexible grids overlaid by a fixed product space. The sample in FIG. 15A also derives the source image by prescaling a raw image.

Another prior problem with the use of a sinc filter in images is linearity, as illustrated with reference to FIG. 18.

Suppose an original image is stored in computer memory. A interpolative filter is applied to reduce resolution with interpolated 50% grays. Unfortunately, the displayed image has staircasing that most people think is inevitable. However, this staircasing is caused by image nonlinearity, as is now explained.

For reasons explained below, cameras output a voltage approximately proportional to the square root of lumens, and displays resquare the result and display. Even though one may calculate 50% gray to memory, on the display a much darker 25% gray is obtained. 25% plus 25% does not equal 100% as illustrated in FIG. 18. The result is a dotted and jagged line, not the smooth line one would expect.

The aliasing is not inevitable. The applicant applies an antialias filter in linear lumen space, then converts back before display. All antialias filters work better in linear lumen space, as illustrated in FIG. 18 for an interpolative filter. In an audio system, linearity distortions cause harmonics, which are well understood by anyone working with sound reproduction. In audio, distortion is measured as the ratio of the magnitude of these harmonics to the desired signal, for example, an amplifier may have "1% distortion". If a second reproduction system squared the incoming signal, this would be considered a very severe distortion.

Figure 18:
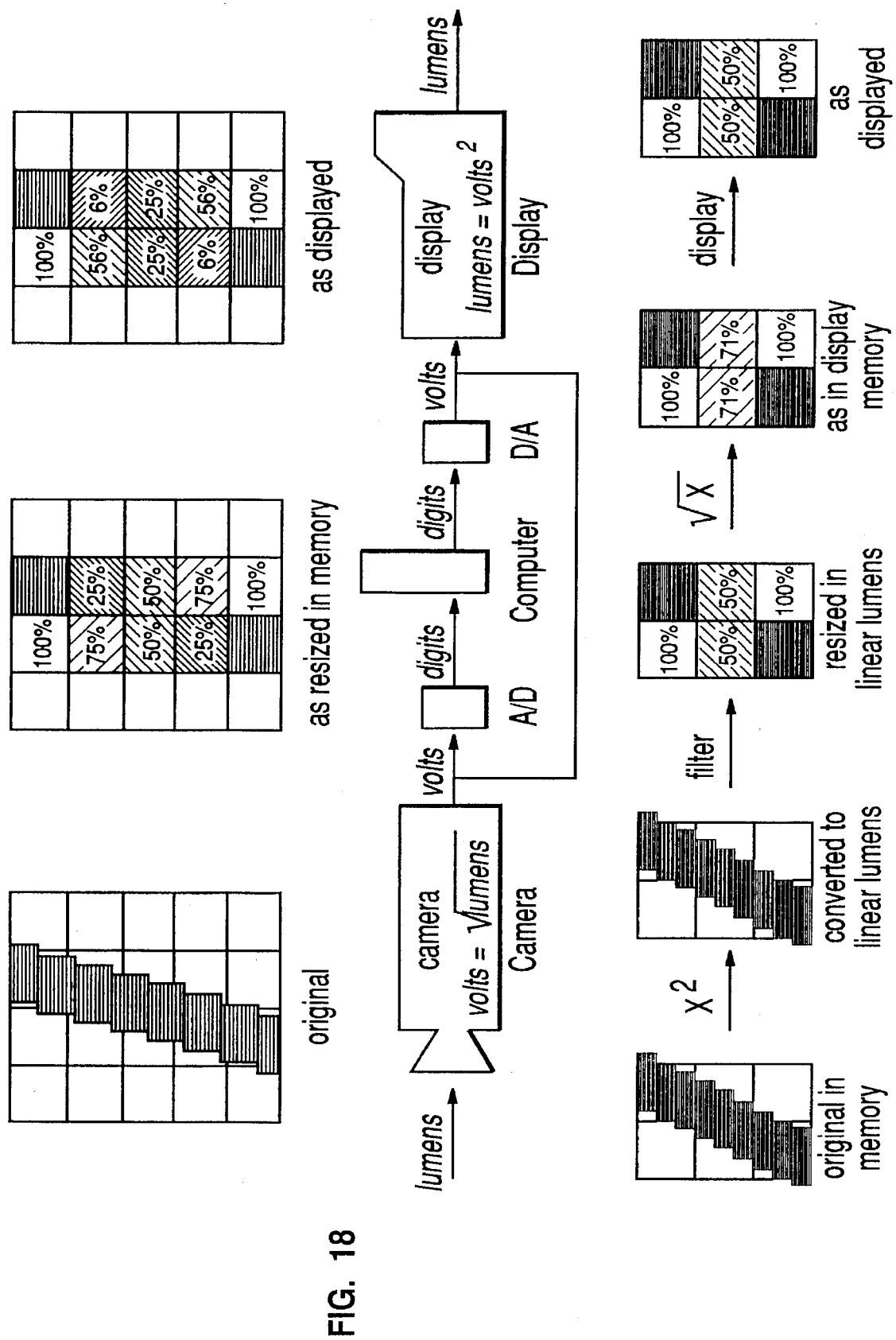
FIGS. 18 and 19A–F illustrate the use of a sinc filter in the image domain.

In imaging systems, the incoming signal is compressed by the camera in FIG. 18 to produce a signal proportional to the square root of brightness. For illustrative purposes let the computer process this signal in the square root domain, let the processing include a resizing using an "ideal" very fast cut filter, so high frequencies beyond a selected frequency no longer exist in the square root domain. Finally, take this filtered signal and resquare it at the output, as in FIG. 18.

An audio engineer can now describe what happens. The squaring process produces strong harmonic distortion so the output now has strong frequency content beyond the supposed cutoff frequency, causing harmonics. Further, cross effects between frequencies cause subharmonics at low frequencies. The high frequencies that would have produced subharmonics to undo the effects of the original square root are no longer present, and therefore the low frequency content of the output does not match the low frequency content of the input. This mismatch caused by subharmonics produces the visual effect of moire and staircasing, as in FIG. 18.

Based on the above discussion, it can be seen that in prior art processing done in the standard video square root domain, harmonics and subharmonics harm the image in the same way aliases harm it by producing false frequencies. These strong harmonics mask the benefits of ideal filtering. This mutual masking of harmonics by aliases, explains why in the prior art neither linear processing or fast-cut filters alone were found to have much advantage. The Applicant has discovered the combination of both provides a considerable advantage over the prior art of image processing.

To understand why virtually all image capture systems operate in the apparently distorted square root space, it is necessary to understand grayscale compression. First, a few definitions of the common term "gamma" may be helpful. Gamma is a photographic measure of contrast, but it can be defined more precisely in several ways:

Gamma is an exponent: Given some process where the output is a function of the input, we can usually approximate the output in a region as some power of the input. This power is given the Greek letter gamma. A gamma of 3.0, for example, means the output is the cube of the input. The gamma of the process may be changed for different levels of input, this is legal. A process may have a gamma of 2.3 when the input is 1, but have a gamma of 0.0 when the input is 0.

Gamma is a gain: It follows mathematically from the above formula that a marginal change in the percentage of the input is amplified by the gamma of the process. A gamma of 0 means that the output does not change with a marginal change in input. A gamma of 1 means the output changes percentage-wise the same as the input. Note this is not the linear definition of gain which is "unites out" over "unites in". Gamma is "percent out" over "percent in".

Gamma is a contrast: Every photographer knows gamma as a measurement of contrast. In consumer TV terminology, the definition is somewhat muddied because the contrast control on a TV is really a linear gain having no effect on gamma, while the TV brightness affects the black level. In professional TV terminology, gamma is the measure of the actual contrast introduced by the electronics.

Gamma is a slope: On a log-log plot, a straight line has a constant gamma. The straight line that approximates the average slope of a film's exposure density plot is the average gamma of that film. Transparencies have a gamma of about 2.0, while negatives have a gamma of about −0.7. This quantitive example shows that the lowered gamma of negatives gives them their ability to record a very wide range of exposures. The negative aspect is just an expedient. Photochemistry yields a negative easier than a positive, so once the requirement of direct visual appeal is dropped by lowering the gamma, it might as well be a negative.

From basic statistical theory, it may be seen that an ideal statistical photon counter exhibits a noise proportional to the square root of the number of photons, or expressed as a ratio, the percent noise is proportional to the inverse square root of the number of photons. By taking the square root of lumens, one would enter a domain in which percent noise is a constant, and a constant delta change anywhere along the graph has an equal statistical significance. In terms of gamma, one would say the capture system has a gamma of 0.5, and, therefore, the display system would need a gamma of 2.0 to match the original image.

The human retina responds very nearly like this photon counter, and the human subjective perception of grayscale and threshold sensitivity to noise maps to the square root domain. For example, a card reflecting 25% of the light is picked as being middle gray between a 0% and 100% card. If any device outputs a generally square root of the number of lumens reaching the original sensor, the output is in this perceptually uniform domain. Any noise introduced in the processing of this signal, which may arise from quantization due to a limited number of bits, or noise caused by tape recording or transmission, will have a balanced distribution between highlights and shadows. Of course, the signal will need to be displayed on a device that resquares the signal during its conversion back to lumens, which in fact is done inherently by the electron gun of a CRT, or by the chemical processes in a photographic print.

Statistical theory, therefore, shows that for balanced distribution of noise, the capture system should have a gamma of exactly 0.5, a perfect square root, and the display system exactly 2.0, a perfect square. In practice, other factors modify these somewhat. In practice, given the nonlinearities of the retina, a gamma closer to 2.2 seems to provide a better balance. Depending on adjustments, most TV monitors have a gamma closer to 1.9. For the purposes of these discussions, these are considered to be close to 2.0 and, therefore, considered a generally square function. Similarly, on the input, many capture systems increase gamma to give a slightly enhanced, more contrast image of a rather dull real world. A typical TV camera has gamma of about 0.7 rather than 0.5. Again, for the purposes of these discussions, that is considered a generally square root relationship in intent, with artistic tastes added onto the basic function.

The discussion above explains why the signal generally available for processing in an imaging signal is already in the square root domain. This is so pervasive that it is not often even noted. However, once the ramifications of working in the square root domain are considered, several classical problems are easily explained. One of these problems is that a "perfect" low pass filter used for resizing does not seem to work nearly as perfectly for image as it does for audio, instead aliases and "jaggedness" along contrast diagonal lines are still seen, despite the classical theory saying it should not. Hence, in the prior art, researchers have used nonideal filters as empirical expedients to reduce these problems, compromising image detail and still not totally eliminating the problems.

In one-dimensional audio, if a "perfect" filter were used to process a signal, but that signal were then reproduced by a transducer, for example, a speaker that squared the result, the squaring would introduce gross harmonics and intermodulation subharmonics, as is well known. The ideal filtering is not the cause of the distortion, the square reproduction is the cause. The distortions would be reduced by substituting the ideal filter with one that muffled the high frequency detail, and with less detail the distortions would be less noticeable. That is, in fact, what the art has determined empirically to do with image processing.

In image reproduction, as has been explained, there are good reasons the transducer squares the signal. Nevertheless, this squaring introduces the harmonics and subharmonics that the art has found objectionable when trying to apply theoretically perfect interpolation filters to the resize process.

The Applicant has discovered that by applying the ideal filter in the linear lumen domain, in which the signal will be finally presented and as it will appear after the squaring process, the unwanted harmonics and subharmonics disappear, while all the advantages of an ideal filter, well known from sampling theory, become manifest.

To practice this invention, the signal is initially received in the generally square root domain used for many good reasons in image processing. This signal is then converted into the domain representing what will be the actual final linear output by squaring the numbers held in the pixels of the image. To cover the full grayscale in this linear space, nearly twice the number of bits are required to store and process a pixel. Normally, this would require 16 bit arithmetic in place of 8 bit arithmetic, although more bits or a floating point representation would be even better. The ideal low pass filters are then applied to this linear domain, and classical resampling for resizing the image done in this linear domain. Finally, after the resizing, the resulting numbers are acted on by a square root function in preparation for efficient storage, transmission, and final reproduction on a transducer that will display a brightness generally proportional to the square of the numbers.

By practicing this invention, images of equal quality can be contained ill an array with about half the pixels compared to the prior art. When applied to the output of a physical scanner run in oversample mode, compared to current art practice of storing the direct output of a physical scanner, the required number of pixels has been found to drop to about one-fourth that required using current art, while avoiding the moire and noise current art uses the exit pixels to avoid. When the implications of this are seen on all aspects of image calculation, transmission and storage in science, medicine and entertainment, the fundamental importance of this invention is apparent.

Figure 19A:
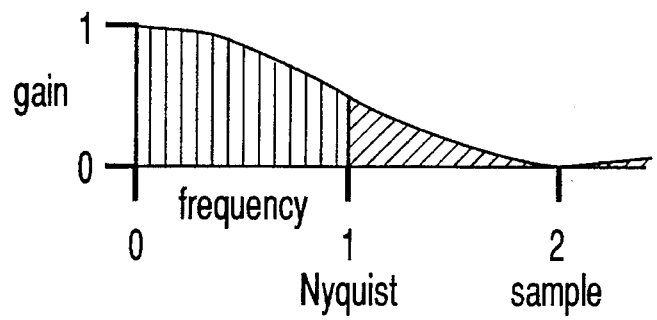
Figure 19B:
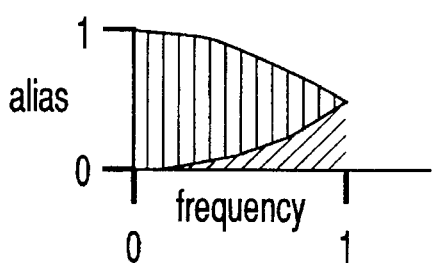
Figure 19C:
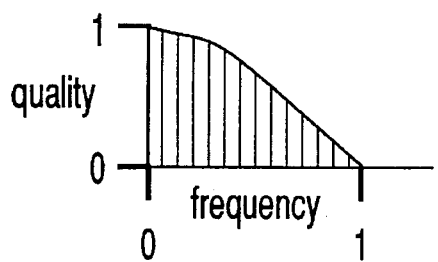
Figure 19E:
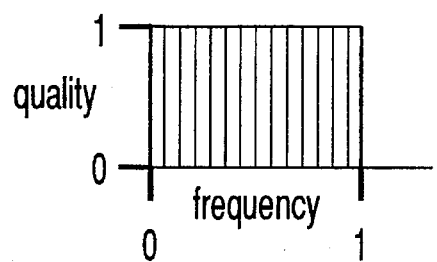

Turning now to FIGS. 19A–F, the advantages of using a sinc filter is quantified for image antialiasing a conventional interpolative anti-alias filter. The frequency response of the interpolation is an offset cosine wave. FIG. 19B reflects the aliases caused by sampling with the filter of FIG. 19A. These aliases undercut the remaining signal. FIG. 19C arbitrarily defines quality as gain minus competing aliases. FIG. 19E is equivalent to FIG. 19C except for the use of a perfect sinc filter, thereby having a flat response with no undercutting aliases.

Figure 19D:
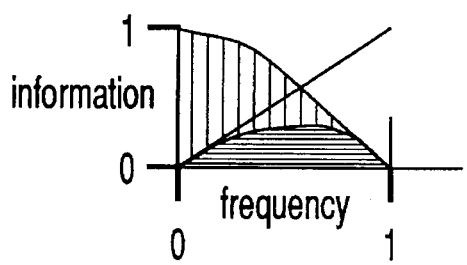

Image information content is proportional to frequency. A 501×501 image contains 251,001 pixels, 1001 more pixels than a 500×500 image, but a 1001×1001 image contains 1,002,001 pixels, 2001 more pixels than a 1000×1000 image. The same frequency increment is "worth" twice as much at twice the frequency. FIG. 19D multiples quality by frequency to give the information, as shown in black. This directly transforms equality to equivalent pixel count.

Figure 19F:
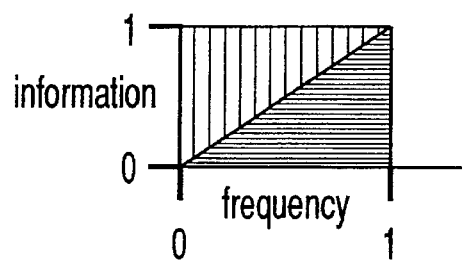

Now compare the Information with an ideal sinc filter as shown in FIG. 19F with that in FIG. 19D to see a rather startling result. The ideal filtering has nearly tripled the information contained in a fixed number of pixels. The applicant has found by empirical experimentation that by using the methods of this invention, either the image quality is tripled, or equivalent image quality can be preserved by using less than half the number of pixels. This is a significant finding and a very important advance to the art of digital image processing and storage applied to fields as diverse as medical imaging and the motion picture industry.

This invention applies two steps of resize to go from the "array resolution", or "A resolution" to the final output "chosen resolution", or "B resolution", as illustrated in FIGS. 16, 17A, 17B, and 17C. The step from A to B resolution is made with a normal convolution window similar to an interpolative window to provide good computation speed and reasonable suppression of aliases at the expense of frequency response. The frequency response is corrected and the aliases clipped in going from B to C resolutions with a much more computationally intensive sinc filter. This can be afforded because the B resolution has far fewer points following the prefilter.

In the preferred embodiment of the scanner, for reasons explained above, the linearity from the sensor is preserved through all the processing steps. The square root, more commonly called "gamma correction", is done after the resizing steps. This is opposite from convention which applies the gamma correction immediately after the sensor. Processing in linear space does require more bits to be retained per sample.

Figure 16:
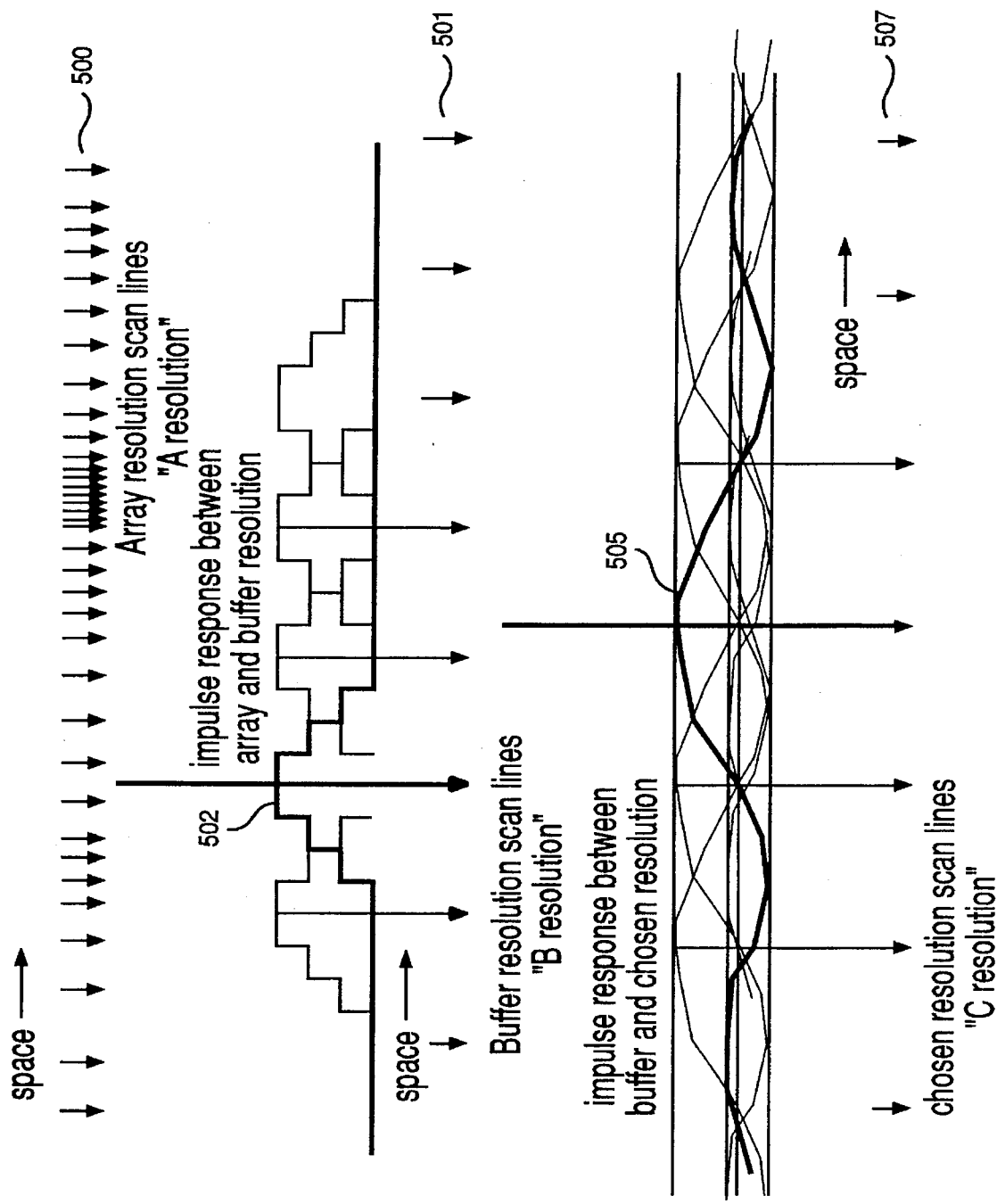
FIG. 16, portrays in one dimension the details of the prescale and precision scaling.

The process of resizing is shown in more detail in FIG. 16. Because the array A resolution pixel spacing 500 is determined by motor speed, it can vary depending on the speed at which tile host is accepting data. If this were to be resized directly to the output resolution using a wide window filter, such as a sinc filter mentioned earlier, three problems are encountered that add considerably to the required computation time. First, the wide width of the window requires many points to be input into the convolution. Second, because the spacing is not fixed, the filter impulse response must be computed as needed or stored at high resolution and the appropriate point calculated and recalled matching each array pixel. Third, because the spacing between input pixels can vary over the width of the impulse, each pixel must be individually weighted in inverse proportion to that spacing.

These problems are solved in the current invention by resizing in two steps. The impulse array of the first step is chosen to maximize the ratio between signal to alias using the narrowest possible window. The absolute frequency response is not critical because attenuation of high frequencies can be compensated by modifying the second filter, thereby freeing the frequency response as a constraint on the first filter.

Figure 17A:
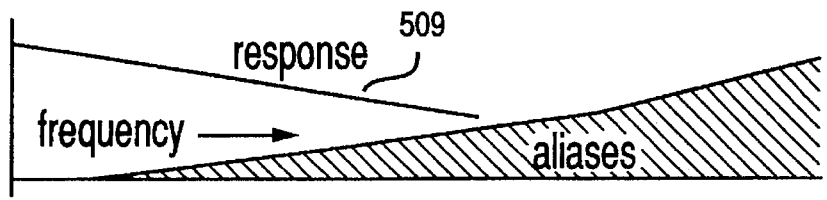
FIGS. 17A, 17B, and 17C show the spatial frequency response and aliases at the different stages of processing portrayed in FIG. 16.
Figure 17B:
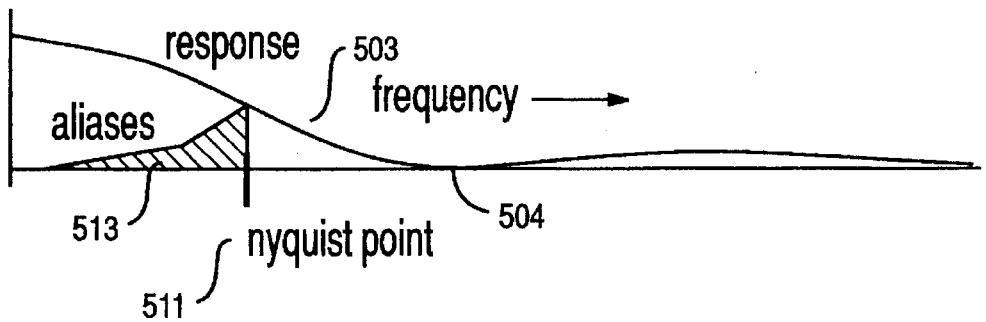

The impulse response chosen to resize the A resolution 500 of FIG. 17A into the B resolution 501 of FIG. 17B is a triangle 502. In space, this is the convolution of two equal square responses, and therefore in frequency it has a response that is the product of two equal sinc functions, curve 502 in FIG. 17B. The window width (the radius of the triangle) was chosen as the width between B resolution pixels 501 to place a gain of exactly zero at the sampling frequency. As a further expedient, the triangle 502 was approximated in steps to further speed calculations using the algorithm described earlier.

This triangle response gives good attenuation of aliases, in fact at twice the Nyquist frequency, the attenuation approaches zero as the square of the distance from twice Nyquist, a double zero as shown in FIG. 17B. The triangle response does however soften desired frequencies, attenuating up to 50% at the Nyquist frequency. Because the signal is digital, and because good signal to alias ratios are maintained, this attenuation is no problem because the response can be recovered in the final filter.

The impulse response of the final filter 505 between the B resolution pixels 501 and C resolution pixels 507 is a modified sinc function 505 that boosts high frequencies in inverse proportion to the losses in the first filter, and losses in the sensor and lens of the scanner. Such a complex wide window filter can be afforded at this point because the number of points input to the filter at the B resolution 501 is considerably less than that of the A resolution 500, the prefilter has made the spacing of pixels at the B resolution 501 roughly fixed and therefore points of the impulse response 505 can be recalled by incrementation by a constant of a pointer into an array holding the impulse response, and each point can be weighted the same.

Figure 17C:
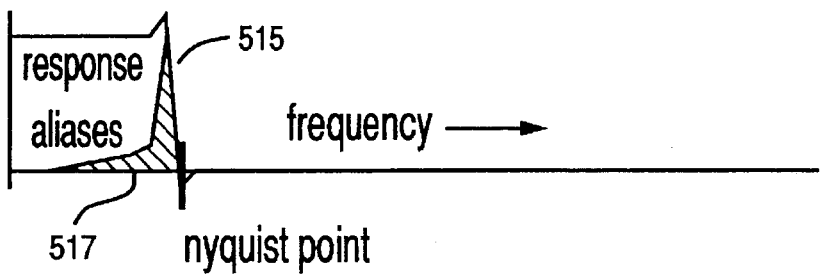

FIGS. 17A–17C illustrate what this multiple pass accomplishes in the frequency domain. FIG. 17A shows a possible response 509 for the array and optics. In the prior art, there was always a compromise between sharpness, leading to excess aliases, or a reduction of aliases through blurring. This invention accepts neither compromise by using oversampling of the physical array coupled with resizing in the digital domain where a precise response can be defined.

In FIG. 17B, the triangular impulse 502 has been applied to the array pixels resulting in the attenuated response 503. Calculations are made only at the discrete points of the B resolution 501, called sample points, and their spacing is called the sampling frequency. The Nyquist frequency is half the sampling frequency, and is the maximum frequency that can be reproduced with that sample spacing if every other point is positive and interstitial points are negative. Sampling theory says that frequencies that pass beyond the Nyquist frequency 511 reflect back as false frequencies or "aliases" 513. The alias curve 513 is a mirror image of that portion of the response curve 503 that extends beyond the Nyquist point 511. The human eye is most sensitive to low frequencies, so the attenuation should be maximum at twice the Nyquist frequency to minimize the aliases at low frequencies. An alias at a low frequency appears to make the picture shimmer, like French Moire silk, giving this effect its name of a "moire pattern".

The initial filter 502 does a good job of removing low frequency aliases, however no narrow window filter can remove aliases near the Nyquist point. These aliases near the Nyquist point are now removed by the second filter 505. This filter can afford to have a much wider window than the prefilter for reasons mentioned above, and therefore introduces very little aliasing of its own, thereby taking from the first signal response 503 that low frequency portion that has minimum aliases. The final response 515 can be extremely flat within the passband allowed by the spacing of pixels in the final chosen output C resolution 507, giving excellent image sharpness, while the residual aliases 517 remain very low at all important frequencies, giving a smoothness to the image. Combined, the image is described by observers as looking "clear", and can produce equivalent clarity with far fewer pixels than in a prior art system that samples by physically placing the sensor elements at the locations of the final chosen output resolution pixels.

In summary, this invention achieves image clarity by physically oversampling the object to be scanned. This oversampling pushes aliases out to very high frequencies. The resolution is then reduced with digital filtering in a way that preserves both flat frequency response and low aliasing. This digital filtering is made practical using a two filter process. The first step makes a rough cut to bring the response close to final resolution. The second step makes a precision cut by trimming the edges of the rough cut image.

While the invention has been shown and described with reference to particular embodiments thereof, it will be understood by those skilled in the art that the foregoing and other changes in form and detail may be made therein without departing from the spirit and scope of the invention.

I claim:

1. A scanner for converting an image on a substrate comprising:

a sensor for converting the substrate image into an array of analog pixels at a first sampling frequency;

a digital converter for converting the array of analog pixels into a first array of digital pixels stored in a digital memory;

a sinc digital filter for converting digital pixel values contained in the first array of digital pixels which are linearly representative of the brightness of light as the image is intended to be displayed to digital pixel values stored in a second array of digital pixels at a second sampling frequency lower than the first sampling frequency; and means for outputting from the scanner apparatus the digital pixel values of the second array of digital pixels.

2. The scanner as recited in claim 1 wherein the second sampling frequency is lower than the first sampling frequency by an arbitrary ratio.

3. The scanner as recited in claim 1 wherein the output means comprises means for outputting numbers the digital pixel values of the second array of digital pixels.

4. The scanner as recited in claim 1 wherein the sensor comprises means for deriving a signal corresponding to a generally square root function of the brightness of light sensed by the sensor means.

5. The scanner as recited in claim 4 wherein the sinc digital filter produces the second array of digital pixels from numbers corresponding to generally the square function of the digital pixel values contained in the first array of digital pixels.

6. The scanner as recited in claim 1 wherein the sinc digital filter further comprises means for adding a portion of a first digital pixel value of the first array of digital pixels and subtracting a portion of a second digital pixel value of the second array of digital pixels for deriving a digital pixel value in the second array of digital pixels.

7. The scanner as recited in claim 6 wherein the sinc digital filter passes a set of frequencies from the first array of digital pixels, lower than half the second sampling frequency, with an attenuation substantially the inverse of an attenuation with which the optical system attenuates the frequency.

8. The scanner as recited in claim 1 wherein the first and second array of digital pixels, and an intermediate array of digital pixels, contain substantially perpendicular rows and columns of pixels, and wherein the sinc digital filter further comprises means for converting the digital pixel values contained in a column of pixels of the first array of digital pixels to digital pixel values that are stored in a column of pixels of the intermediate array of digital pixels.

9. The scanner as recited in claim 8 wherein the sinc digital filter further comprises means for converting the digital pixel values contained in a row of pixels of the intermediate array of digital pixels to digital pixel values that are stored in a row of pixels of the second array of digital pixels.

10. The scanner as recited in claim 9 wherein a prescaled digital array of pixels contains mutually perpendicular rows and columns of pixels, and wherein the sinc digital filter further comprises a prefilter for converting the digital pixel values contained in a set of rows of pixels of the first array of digital pixels to digital pixel values that are stored in a row of pixels of the prescaled digital array of pixels, and wherein the intermediate array of digital pixels is derived from the prescaled array of digital pixels.

11. A method for converting an image on a substrate comprising the steps of:

a sensor for converting the substrate image into an array of analog pixels at a first sampling frequency;

a digital converter for converting the array of analog pixels into a first array of digital pixels stored in a digital memory;

a sinc digital filter for digitally converting digital pixel values contained in the first array of digital pixels which are linearly representative of the brightness of light as the image is intended to be finally displayed to digital pixel values stored in a second array of digital pixels, at a second sampling frequency lower than the first sampling frequency; and means for outputting from the scanning apparatus the digital pixel values of the second array of digital pixels.

12. The method as recited in claim 11 wherein the second sampling frequency is lower than the first sampling frequency by an arbitrary ratio.

13. The method as recited in claim 11 which further comprises the step of adding a portion of a first digital pixel value of the first array of digital pixels and subtracting a portion of a second digital pixel value of the second array of digital pixels for deriving a digital pixel value in the second array of digital pixels.

14. The method as recited in claim 13 further comprises the step of passing a set; of frequencies from the first array of digital pixels, lower than half the second sampling frequency, with an attenuation substantially the inverse of an attenuation with which the optical system attenuates the frequency.

15. The method as recited in claim 11 wherein the first and second array of digital pixels, and an intermediate array of digital pixels, contain substantially perpendicular rows and columns of pixels, and wherein the method further comprises the step of converting the digital pixel values contained in a column of pixels of the first array of digital pixels to digital pixel values that are stored in a column of pixels of the intermediate array of digital pixels.

16. The method as recited in claim 15 wherein the sinc digital filter further comprises the step of converting the digital pixel values contained in a row of pixels of the intermediate array of digital pixels to digital pixel values that are stored in a row of pixels of the second array of digital pixels.

17. The method as recited in claim 16 wherein a prescaled digital array of pixels contains mutually perpendicular rows and columns of pixels, and wherein the method further comprises a step of converting the digital pixel values contained in a set of rows of pixels of the first array of digital pixels to digital pixel values that are stored in a row of pixels of the prescaled digital array of pixels, and wherein the intermediate array of digital pixels is derived from the prescaled array of digital pixels.

\* \* \* \* \*

UNITED STATES PATENT AND TRADEMARK OFFICE
CERTIFICATE OF CORRECTION

PATENT NO. : 5,572,608
DATED : November 5, 1996
INVENTOR(S) : Albert D. Edgar

It is certified that error appears in the above-indentified patent and that said Letters Patent is hereby corrected as shown below:

Col. 26, Claim 11, delete lines 38-54 and insert therefor --A method for converting an image on a substrate to digital pixels comprising the steps of:

for converting the substrate image into an array of analog pixels at a first sampling frequency using a scanning apparatus;

converting the array of analog pixels into a first array of digital pixels stored in a digital memory;

digitally converting digital pixel values contained in the first array of digital pixels which are linearly representative of the brightness of light as the image is intended to be finally displayed to digital pixel values stored in a second array of digital pixels at a second sampling frequency lower than the first sampling frequency using a sinc digital filter; and

UNITED STATES PATENT AND TRADEMARK OFFICE
CERTIFICATE OF CORRECTION

PATENT NO. : 5,572,608
DATED : November 5, 1996
INVENTOR(S) : Albert D. Edgar

It is certified that error appears in the above-indentified patent and that said Letters Patent is hereby corrected as shown below:

outputting from the scanning apparatus the digital pixel values of the second array of digital pixels--.

Signed and Sealed this

Seventh Day of July, 1998

*Attest:*

*Attesting Officer*

BRUCE LEHMAN

*Commissioner of Patents and Trademarks*